United States Patent [19]

Buxton

[11] Patent Number: 5,634,079
[45] Date of Patent: May 27, 1997

[54] SYSTEM FOR PROVIDING FOR A PARALLEL PORT WITH STANDARD SIGNALS AND A FLASH RECOVERY MODE WITH SECOND PREDETERMINED SIGNALS REDEFINING PARALLEL PORT WITH ALTERNATE FUNCTIONS

[75] Inventor: Clark L. Buxton, St. Joseph, Mich.

[73] Assignee: Zenith Data Systems Corporation, Sacramento, Calif.

[21] Appl. No.: 885,805

[22] Filed: May 15, 1992

[51] Int. Cl.$^6$ .................................................. G06F 3/00
[52] U.S. Cl. ........................ 395/892; 395/832; 395/833; 395/834
[58] Field of Search .................... 395/275, 575, 395/430, 830, 833, 832, 834, 892

[56] References Cited

U.S. PATENT DOCUMENTS

| | | | |
|---|---|---|---|
| 4,742,485 | 5/1988 | Carlson et al. | 395/275 |
| 4,926,373 | 5/1990 | Takenska | 395/275 |
| 5,113,457 | 5/1992 | Pewg | 395/275 |
| 5,195,130 | 3/1993 | Weiss et al. | 379/98 |
| 5,239,627 | 8/1993 | Beck et al. | 395/275 |
| 5,325,529 | 6/1994 | Brown et al. | 395/700 |
| 5,388,267 | 2/1995 | Chan et al. | 395/700 |
| 5,410,699 | 4/1995 | Bealkowski et al. | 395/700 |

OTHER PUBLICATIONS

"All about Parallel–Port Signals", John Yacono, *Popular Electronics*, Jan. 1992, pp. 38–41 and 94.
"Troubleshooting Parallel Connections", John Yacono, *Popular Electronics*, Feb. 1992, pp. 41–48 and 94.
"Designing with Flash Memory", Markus A. Levy, *Circuit Cellar Ink*, Dec. '90/Jan. '91, pp. 50–58.
"IC Memory Cards in Harsh Environments", Daniel Sternglass, published in *Memory Card Systems and Design*, March/April 1991.

Primary Examiner—Thomas C. Lee
Assistant Examiner—Anderson I. Chen
Attorney, Agent, or Firm—Fitch, Even, Tabin & Flannery

[57] ABSTRACT

A computer system as provided with an internal flash ROM which includes the BIOS. In the event the flash ROM becomes corrupt, a special purpose interface allows for mode switching of a standard parallel port from a standard peripheral interface, such as a printer interface to a special purpose interface to enable the BIOS to be executed from an external ROM or another computer connected to the parallel port.

11 Claims, 11 Drawing Sheets

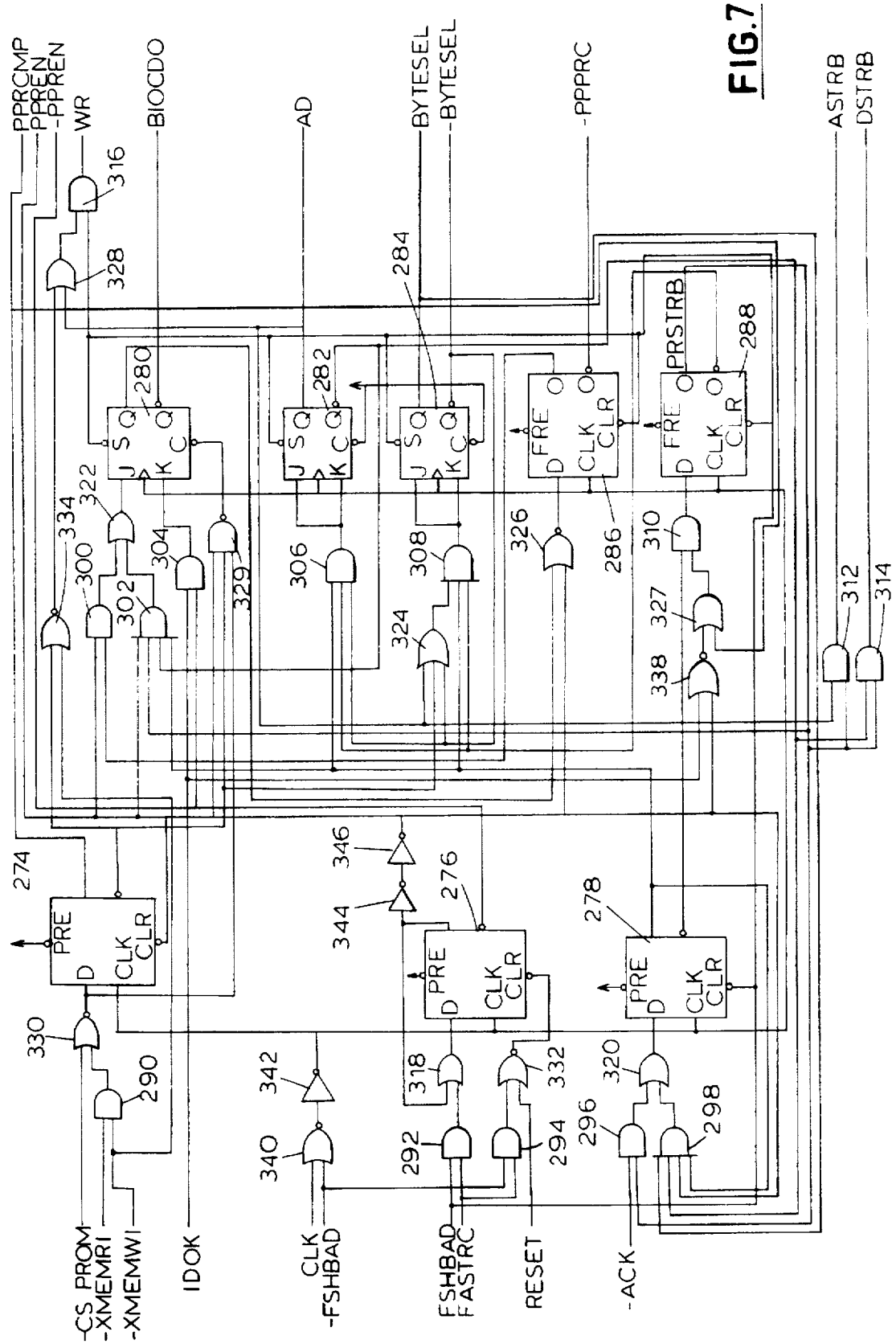

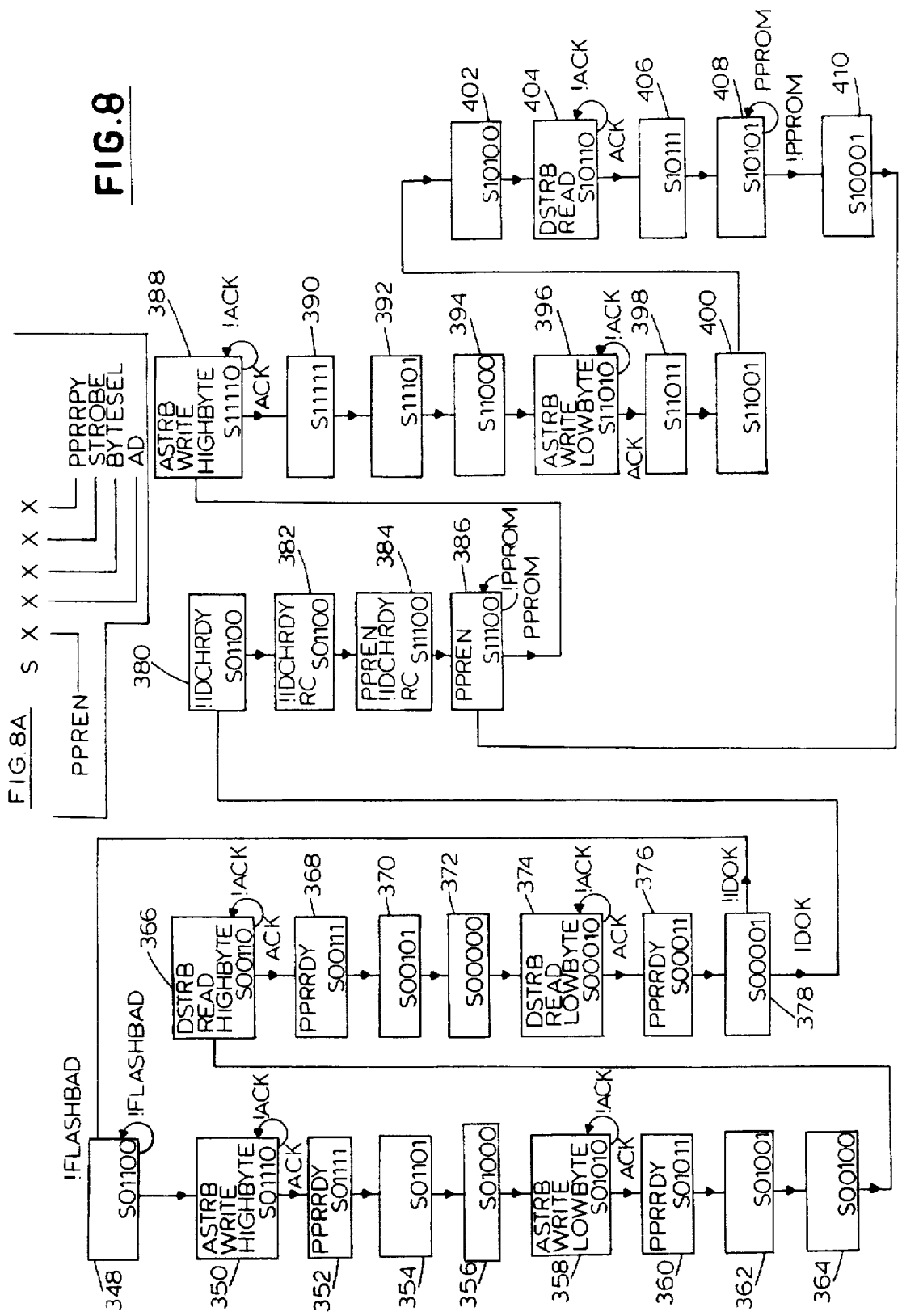

SYSTEM FOR PROVIDING FOR A PARALLEL PORT WITH STANDARD SIGNALS AND A FLASH RECOVERY MODE WITH SECOND PREDETERMINED SIGNALS REDEFINING PARALLEL PORT WITH ALTERNATE FUNCTIONS

BACKGROUND OF THE INVENTION

CROSS REFERENCE TO RELATED APPLICATIONS

The present application is related to United States Patent Application Serial No. 07/995,803 entitled, "A Flash Disaster Recovery ROM and Utility to Reprogram Multiple ROMs in the Event of Data Corruption" filed Dec. 23, 1992 by Min Eig Lee, et al., and U.S. patent application Ser. No. 07/885,804 entitled "Multiple Mode standard Parallel Port for a Personal Computer" filed May. 15, 1992 by Clark Buxton et al., both assigned to the same assignee as the assignee of the present application.

1. Field of the Invention

The present invention relates to computer systems and more particularly to a computer system which includes a flash read only memory (or other electrically programmable memory) which contains the instructions for the basic input output system (BIOS); supported by a special purpose interface for switching the mode of operation of a parallel port from a standard peripheral interface, such as a printer interface, to a special purpose interface to enable the BIOS to be executed from an external ROM or another computer connected to the parallel port in the event the flash ROM becomes corrupt.

2. Description of the Prior Art

IBM type PC/AT compatible computers contain a set of routines known as the basic input output system (BIOS) on a ROM chip within the computer. These BIOS routines control the input output functions of the computer's peripheral devices, such as the display, keyboard and disc drives. In particular, these BIOS routines act as an interface to translate various software commands for the peripheral devices from various application programs and the disc operating system (DOS) to commands that are compatible with the hardware. In addition, the BIOS includes routines that either contain information or perform tasks that are fundamental to other aspects of the computer's operation, such as keeping track of the date and the time of day.

Occasionally, the BIOS needs to be updated for various reasons. For example, early BIOS versions did not support 3-½ inch floppy disc drives and thus older personal computers which were later equipped with such drives required a BIOS update. There are various other situations which could require a change of the BIOS. For example, existing computer systems may include a version of BIOS that does not support a CD ROM or newer graphic standards. In such situations, it is necessary for the BIOS ROM, normally connected to the motherboard inside the computer housing, to be replaced with a new ROM that contains the updated BIOS if a CD-ROM or enhanced graphics are desired.

When the BIOS requires updating, it is necessary that the computer case be opened and the motherboard removed. Once the motherboard is removed, the ROM chip which contains the BIOS is then replaced with the new ROM chip which contains the updated version of the BIOS. The motherboard is then replaced and the computer case is closed. As such, replacement of the BIOS chip is rather cumbersome and oftentimes is done by a computer technician which can be relatively expensive.

SUMMARY OF THE INVENTION

It is an object of the present invention to solve various problems with personal computers that exist in the prior art.

It is another object of the present invention to allow the BIOS to be updated rather quickly and readily.

It is a further object of the present invention to allow the BIOS to be updated without the necessity of removing the motherboard.

It is a further object of the present invention to allow the BIOS to be provided on a flash ROM.

It is yet another object of the present invention to allow the BIOS to be executed by way of an external ROM or computer connected to the parallel port in the event that the internal flash ROM which becomes corrupt.

It is yet a further object of the present invention to enable the BIOS to be executed by way of a parallel port.

It is yet another object of the present invention to provide a special purpose interface for switching the mode of operation of a standard parallel port to a special purpose interface to enable the BIOS to be executed from a parallel port.

DESCRIPTION OF THE DRAWINGS

These and other objects of the present invention will be readily understood with reference to the following specification and accompanying drawing, wherein:

FIG. 7 is a schematic diagram of a state machine which forms a portion of the parallel port interface in accordance with the present invention;

FIG. 8 is a sequential cycle diagram of the state machine that controls the parallel port interface in accordance with the present invention;

FIG. 8A illustrates the state bit definitions;

DETAILED DESCRIPTION OF THE PREFERRED EMBODIMENT

The present invention relates to an IBM type PC/AT compatible type personal computer which includes an internal flash ROM which contains the BIOS routines. One of the advantages of using a flash ROM for the BIOS is that it allows updating of the BIOS without having to physically remove any components within the computer. However, in such applications, it is necessary to provide an alternate method for booting the computer in the event that the internal flash ROM programming is interrupted or becomes corrupt.

Accordingly, in accordance with the present invention, a parallel port interface is provided which allows the execution of ROM code from an external ROM connected to a standard parallel port connector. The external ROM can also be used for updating the internal flash ROM and to allow first time programming of the internal flash ROM during manufacturing.

An important aspect of the invention is that the interface in accordance with the present invention is adapted to utilize standard parallel ports. In a normal mode of operation, the parallel port interface functions as a standard parallel port. During such a normal mode of operation, software written to a control register asserts and deasserts the various parallel port control signals to control the handshaking with the device connected to the parallel port. In an external ROM mode of operation, various standard parallel port signal functions are redefined to enable the BIOS to be executed from an external ROM connected to the parallel port as will be discussed below in more detail. In the external ROM mode of operation, the handshaking is done by the hardware described below.

FIRMWARE SUPPORT

As will be discussed in more detail below, firmware support is provided to check the integrity of the flash ROM on power up. Should the flash ROM be determined to be corrupt, the parallel port interface logic writes a two byte identification address to the parallel port to determine if a valid external ROM is connected to the parallel port connector. If not, the system will cycle until a valid identification code is returned. On the other hand, if a valid ROM is connected to the parallel port connector, a two byte identification code will be returned. Once the two byte identification code is returned and decoded by the parallel port interface logic, an I/O channel ready signal IOCHRDY is deasserted to stop the CPU to enable the interface logic to reset the CPU by way of a fast reset signal FASTRC. While the FASTRC signal is active, the external ROM is reconfigured to reside at the boot address.

Figure 1:
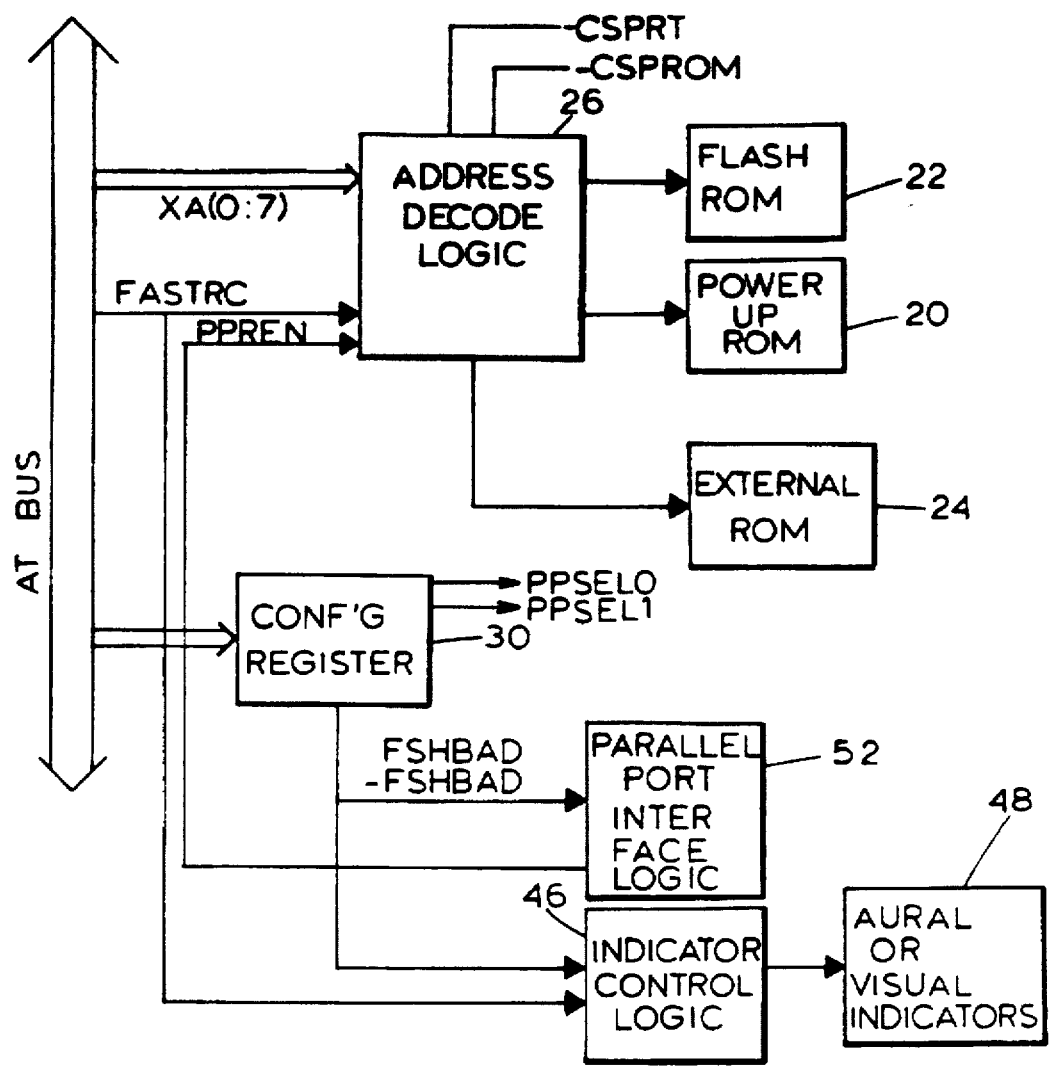
FIG. 1 is a simplified block diagram of a computer system which includes the parallel port interface in accordance with the present invention.

More specifically, with reference to FIG. 1, a power up ROM 20 provides the firmware support for checking the integrity of an internal flash ROM 22, which contains the BIOS routines. As discussed above, should the flash ROM 22 be determined to be corrupt, an external ROM 24 which contains the BIOS instructions is remapped to the boot address while the FASTRC signal is active after a valid identification code is returned from external ROM 24. More specifically, the memory map is reconfigured by address decode logic 26 which includes inputs from the system address bus XA(0:7) and a FASTRC signal (a standard AT type control signal). As mentioned above, the FASTRC signal is used to reconfigure the memory map as illustrated in Table 1.

TABLE 1

|  | POWER UP | VALID ID |
|---|---|---|
| POWER UP ROM | FFFFFC00H-FFFFFFFFH | Not Mapped |
| FLASH ROM | FFFC0000H-FFFDFFFFH | FFFC0000H-FFFDFFFFH |
| EXTERNAL ROM | Not Mapped | FFFE0000H-FFFFFFFFH |

Figure 2:
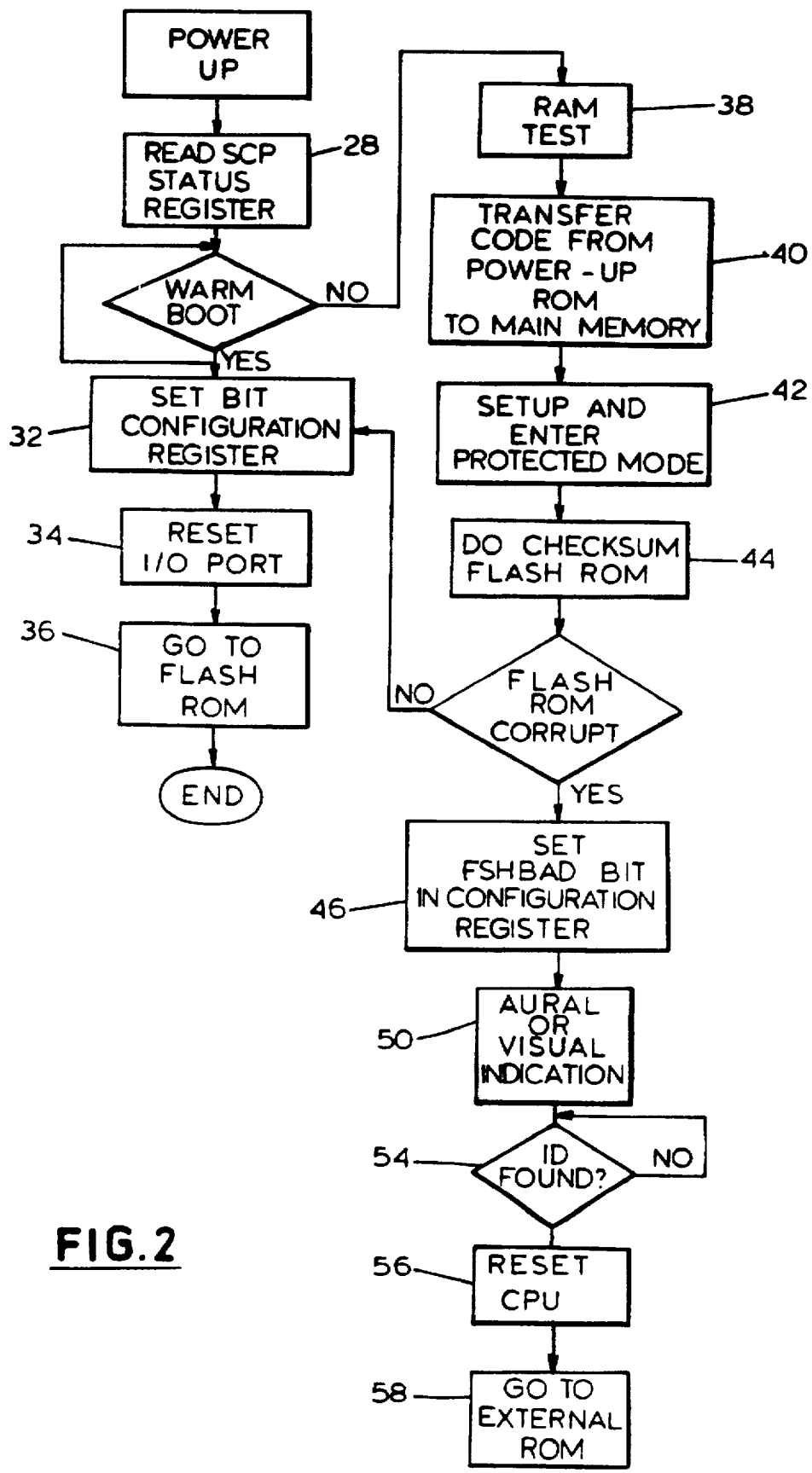
FIG. 2 is a flow chart illustrating the firmware support for the parallel port interface in accordance with the present invention.

The firmware support for the power up ROM 20 is illustrated in FIG. 2. At power up, the status of the system control processor (not shown) is read to determine whether the system boot was a warm boot or a cold boot in step 28. If a warm boot is indicated, a bit in a configuration register 30 (FIG. 1) is set in step 32. Subsequently, the parallel port is reset in step 34 to configure the parallel port for a standard peripheral, such as a printer, and system control is passed to the internal flash ROM 22 in step 36.

If the system control processor indicates a cold boot, a test of the RAM is conducted in step 38. After the RAM test is complete, the code from the power up ROM 20 is transferred to main memory in step 40. Once the code from the power up ROM 20 is transferred to main memory, the CPU is configured for the protected mode in step 42. Subsequently, a CHECKSUM of the flash ROM 22 is conducted in step 44. If the code in the internal flash ROM 22 is determined to be invalid, a FSHBAD bit is set in the configuration register 30 in step 46. At the same time the FSHBAD signal is set, indicator control logic 46 (FIG. 1) is enabled to drive various aural or visual indicators 48 to indicate that the flash ROM 22 is corrupt and that an external ROM 24 should be connected to the parallel port in step 50.

In response to the FSHBAD bit being set, parallel port interface logic, generally identified with the reference numeral 52, begins looking for a valid identification code from the external ROM 24 in step 54. If a valid identification code is not found, the system keeps cycling. Once a valid identification code is found, the parallel port interface logic 52 stops the CPU with an I/O channel ready signal IOCHRDY and resets the CPU in step 56 with the FASTRC signal. During the CPU reset, the parallel port interface logic 52 asserts a signal PPREN that causes the address decode logic 26 to remap the external ROM 24 as shown in Table 1.

When the internal flash ROM 22 is found to be valid, the sequence of events is the same as for a warm boot. In particular, if the internal flash ROM 22 is found to be valid, the system proceeds to step 32 and sets a bit in the configuration register 30. Subsequently, the parallel port is reset in step 34. After the parallel port is reset, system control is passed to the internal flash ROM 22 in step 36.

PARALLEL PORT PIN FUNCTIONS

Figure 3:
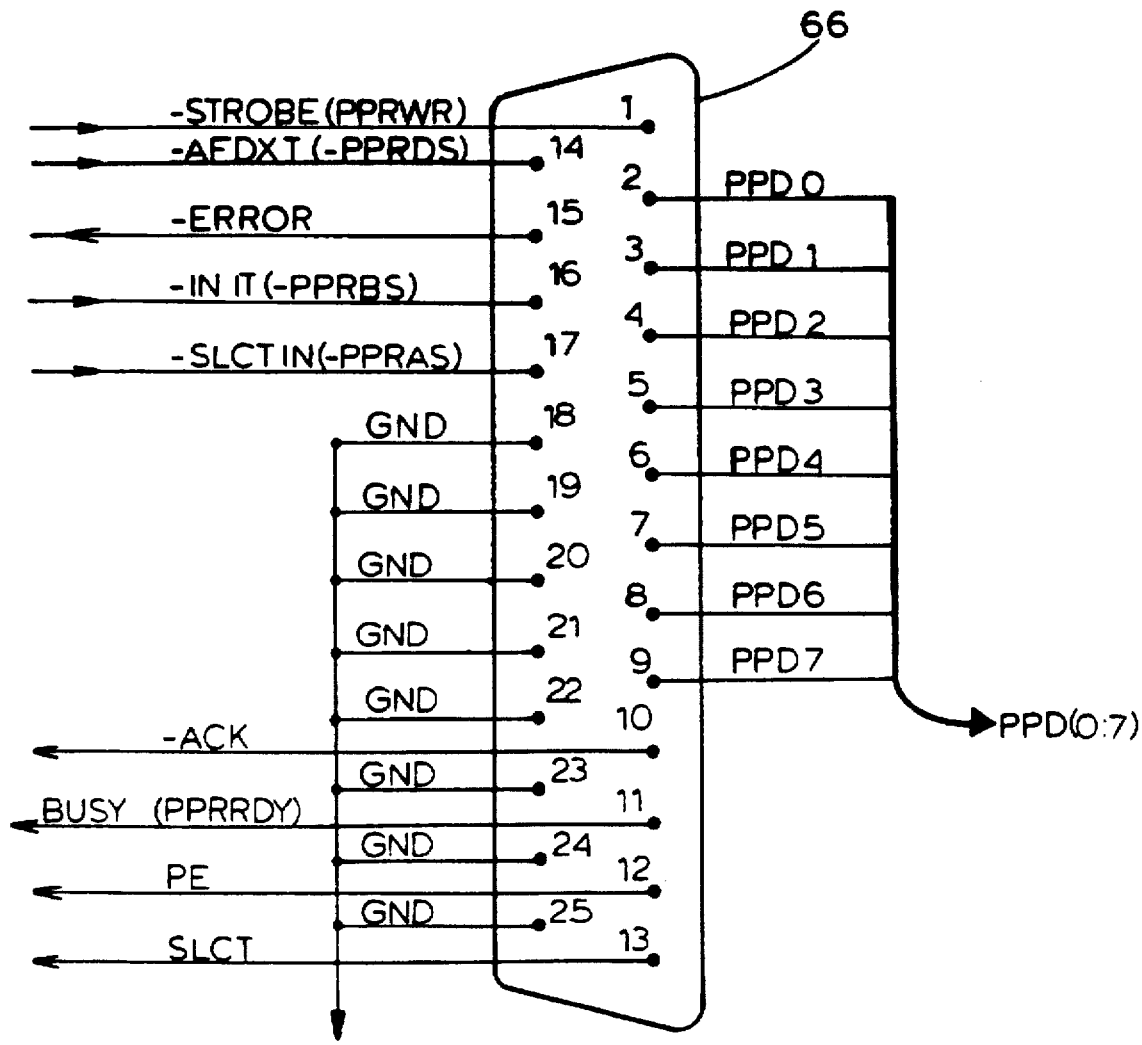
FIG. 3 is a pin diagram of a standard 25 pin D type connector.

The parallel port interface 48 in accordance with the present invention is adapted to be used with a standard 25 pin, D type connector 66 as shown in FIG. 3. During normal mode of operation (e.g., when a peripheral device, such as a printer, is connected to the parallel port), the pin functions are standard as defined in Table II.

TABLE II

| Pin Number | Signal Name | Description |
|---|---|---|
| 1 | −STROBE | Strobe bit. This active low pulse indicates that the computer is transmitting parallel data. It is used to time the data being sent to the peripheral device. |
| 2–9 | PPD0−PPD7 | Data bits 0 through 7. These signals are the system buffered and latch data bits. |
| 10 | −ACK | Acknowledge. This active low signal indicates that the peripheral device has received the data. It can be used for hardware handshaking. |
| 11 | BUSY | Busy. This signal indicates that the peripheral device is busy and not ready to receive data. Can be used for hardware handshaking. |
| 12 | PE | Paper End (out). This signal indicates a peripheral fault. It is used by a printer to indicate that it is out of paper. |
| 13 | SLCT | Select. This signal informs the peripheral that it has been selected. |
| 14 | −AFDXT | Auto Feed. This active low signal requests a paper feed by the peripheral. |
| 15 | −ERROR | Printer Fault. This active low signal indicates that an error condition exists in the peripheral. |
| 16 | −INIT | Initialize. This active low signal is used to initialize the peripheral. |
| 17 | −SLCTIN | Select In. This active low signal is used by the peripheral device to indicate that it has been selected. |
| 18–25 | GND | Ground. |

Once the parallel port interface 48 enters the external ROM mode of operation as discussed above, the signal functions of certain of the pins, as identified below in Table III and illustrated in parenthesis in FIG. 3, are redefined in order to permit the BIOS to be executed from a valid external ROM 24 connected to the parallel port connector 66 in place of a standard peripheral, such as a printer.

TABLE III

| Pin Name | Type | Redefined Function | Description |
|---|---|---|---|
| INIT (16) | Output | −PPRBS | Byte select |
| −STROBE (1) | Output | −PPRWR | Write strobe |
| −SLTIN (17) | Output | −PPRAS | Address strobe |
| −AFDXT (14) | Output | −PPRDS | Data strobe |
| BUSY (11) | Input | PPRRDY | Ready input |
| DATA (2–9) | I/O | PPDATA | PPROM address and data signals |

PARALLEL PORT INTERFACE

Figure 4:
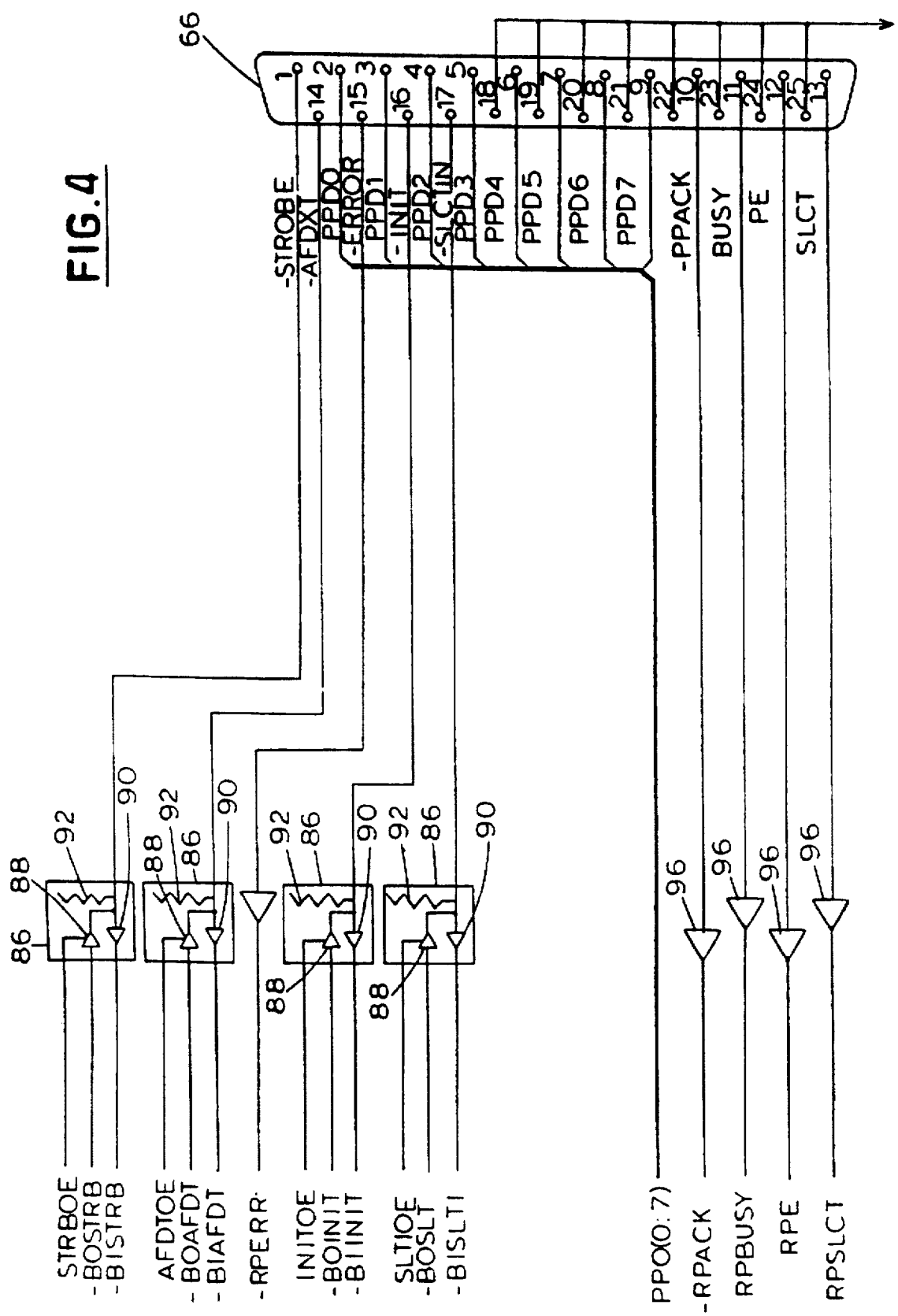
FIG. 4 is a schematic diagram of the parallel port interface connections to the connector illustrated in FIG. 3 in accordance with the present invention.
Figure 5A:
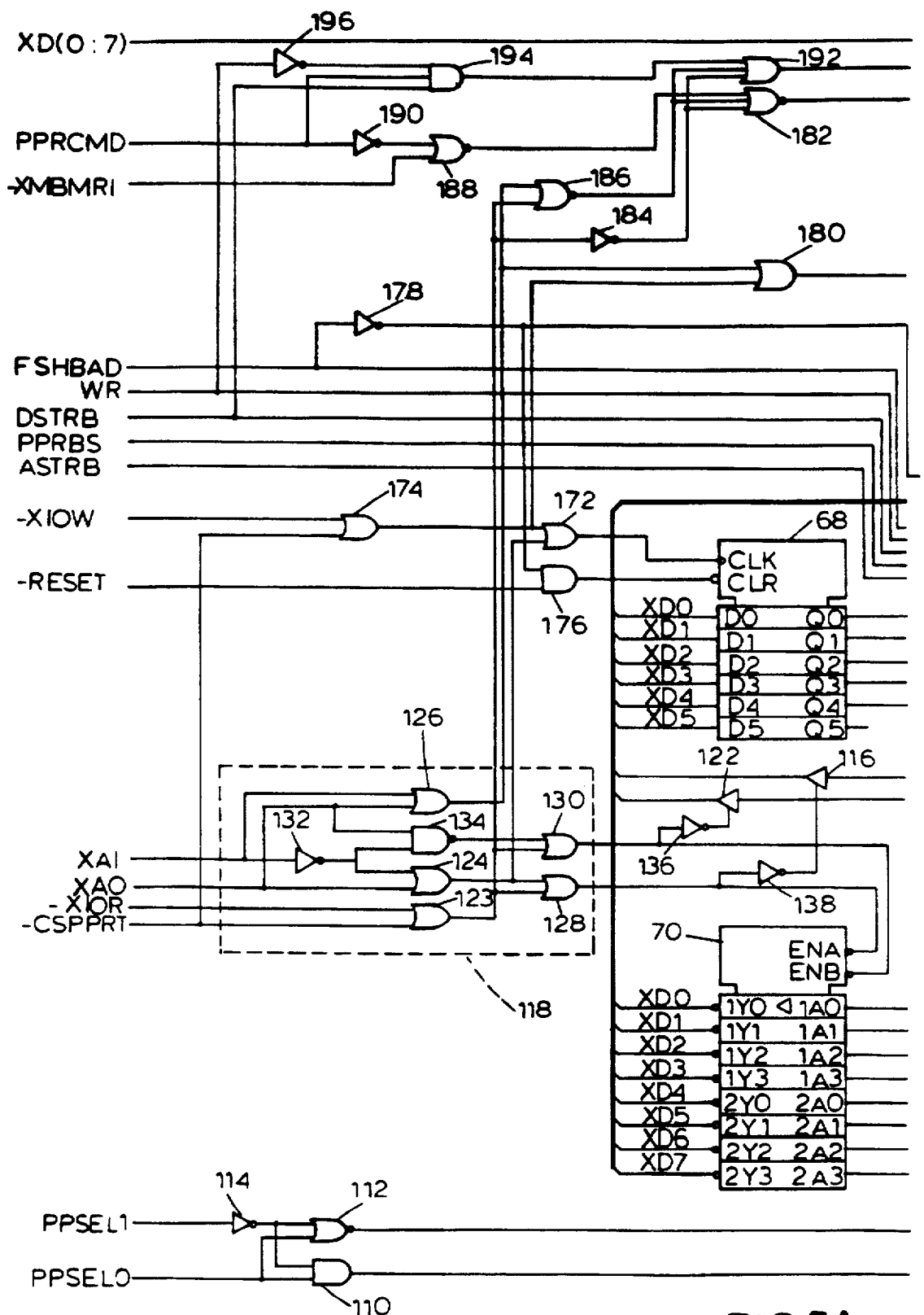
FIGS. 5A and 5B are schematic diagrams of the control logic for the control, status and data read and write registers for the parallel port interface in accordance with the present invention.
Figure 5B:
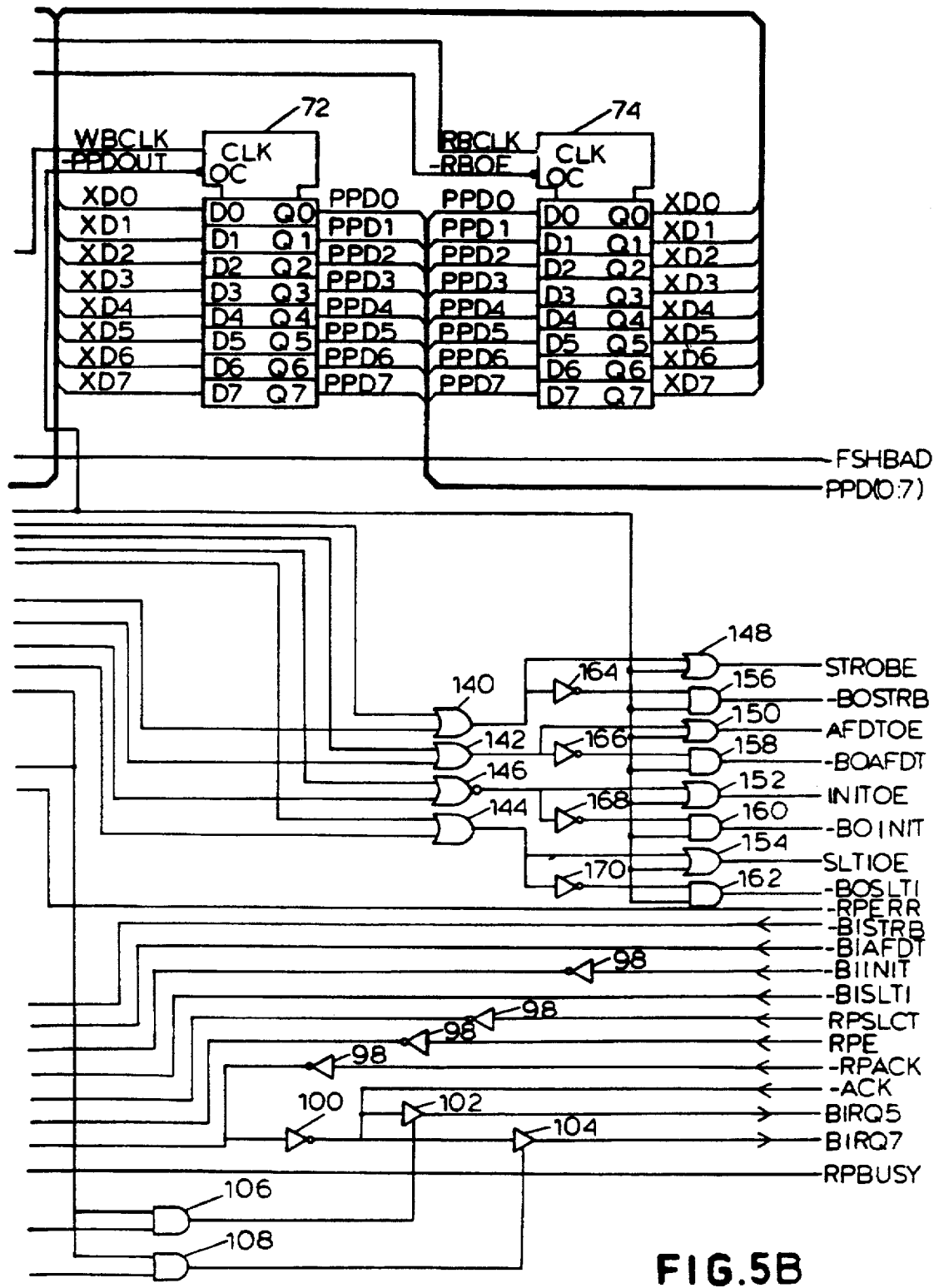
Figure 6A:
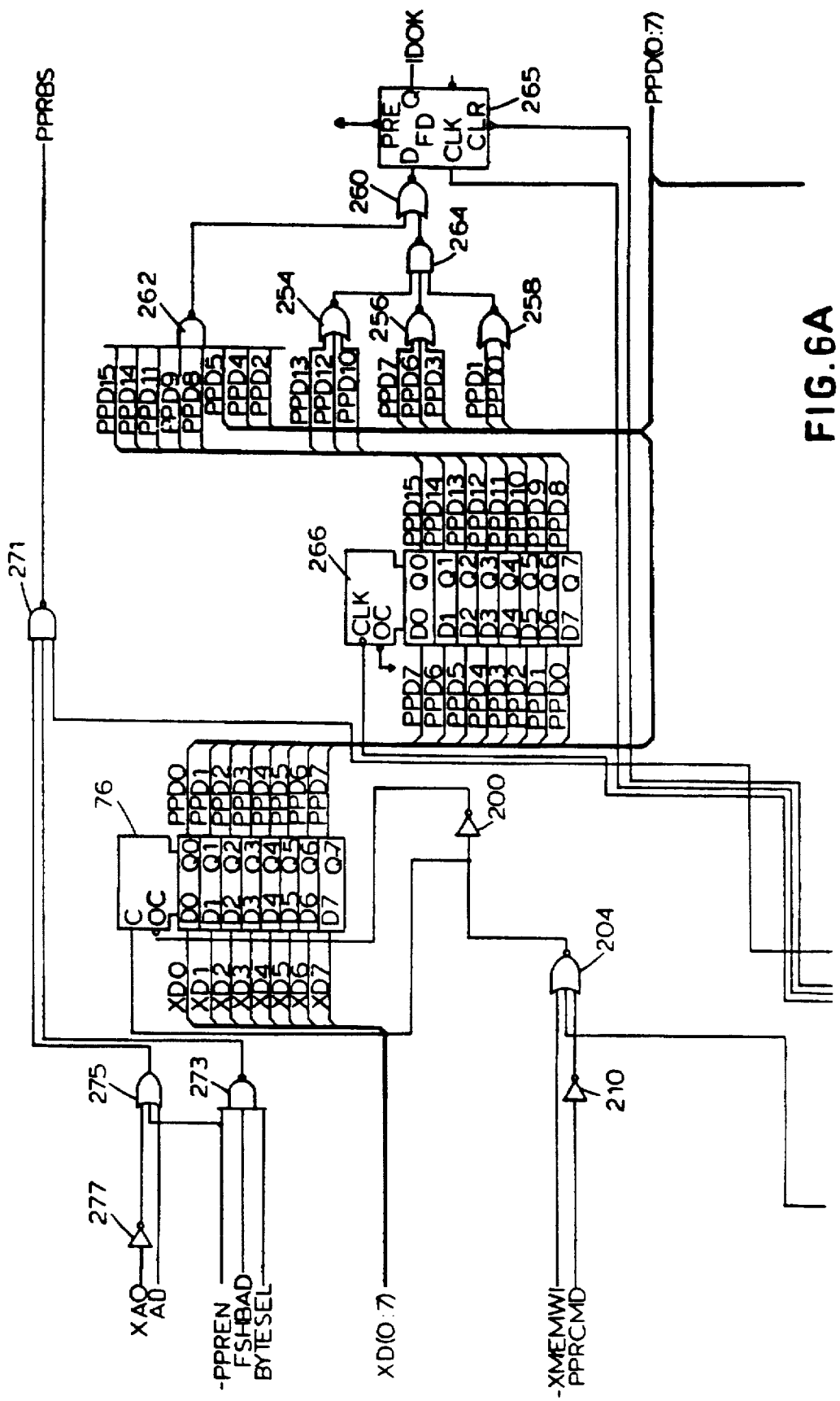
FIGS. 6A and/6B schematic diagrams of the control logic for address multiplexers, identification code decoding and write buffer for the parallel port interface in accordance with the present invention.
Figure 6B:
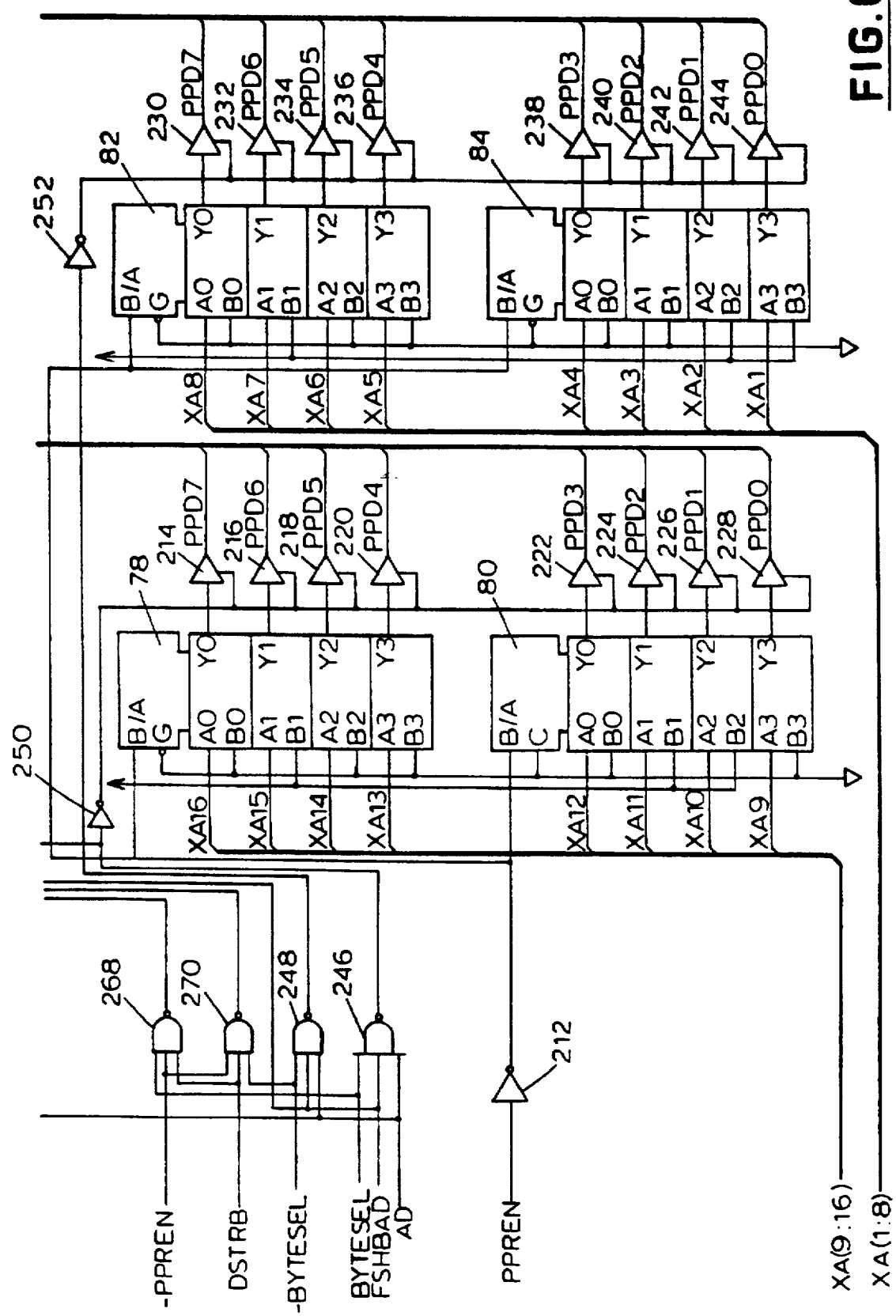

The parallel port interface 48, in accordance with the present invention, illustrated in FIGS. 4–7, includes a control register 68, a status register 70 (FIG. 5A), a standard parallel port write data latch 72; a read data latch 74 (FIG. 5B); a standard parallel port write latch 76 (FIG. 6A) and four address multiplexers 78, 80, 82 and 84 (FIG. 6B). As will be discussed in more detail below, the status register 70 enables various parallel port control and status signals to be read by the CPU. The control register 68 can be written to by the CPU by way of the system data bus XD(0:7) to control various signals output to the parallel port. The read and write latches 76 and 74, respectively, enable the external ROM 24 to be written to and read by the CPU. The write buffer 72 is a standard parallel port write buffer that enables the CPU to transfer data to a peripheral, such as a printer, normally connected to the parallel port connector 66 during a normal mode of operation. As will be discussed in more detail below, the address multiplexers 78, 80, 82, and 84 enable the CPU to address the parallel port by way of the system address bus XA (1:16) and are also used in an external ROM mode of operation to write a predetermined two byte address to determine if a valid external ROM 24 is connected to the parallel port connector 66.

The parallel port interface is connected to the connector 66 as described below. More particularly, the parallel port data bus PPD (0:7) is applied to pins 2–9 of the connector 66 while pins 18–25 are grounded. However, as previously mentioned, various parallel port control signals are redefined when the parallel port interface logic 48 is in an external ROM mode of operation. In particular, these control signals are the -STROBE, -AFXDT, -INIT and -SLCTIN signals as defined in Table III. In order to enable the CPU to read these signals, the -STROBE, -AFDXT, -INIT, -SLCTIN signals, available at pins 1, 14, 16 and 17, respectively, of the connector 66 are buffered by way of a plurality of I/O buffers 86. Each I/O buffer 86 includes a tristate device 88, a buffer 90 and a pull up resistor 92. The I/O buffers 86 enable these signals to be read back by the status register 70 (FIG. 5A).

In particular, buffered output signals, -BOSTRB, -BOAFDT, -BOINIT and -BOSLTI, developed by the control logic as will be discussed below, are applied to the tristate devices 88 which, in turn, are connected to pins 1, 14, 16 and 17, respectively, by way of the pull-up resistors 92. These tristate devices 88 are under the control of the operate enable signals STRBOE, AFDTOE, INITOE and. SLTIOE. The internal buffers 90 of each of the I/O buffers 86 are connected to the output of the tristate devices 88. This enables the buffered output signals -BOSTRB, -BOAFDT, -BOINIT and -BOSLTI to be read back at the status register 70 as buffered input signals; -BISTRB, -BIAFDT and -BISLT1. More particularly, the buffered input signals are applied directly to pins 1A0, 1A1 and 1A3 of the status register 70. The buffered input signal -BIINIT is applied to pin 1A2 of the status register 70 by way of an inverter 94.

The handshake status signals -PPACK, BUSY, PE and SLCT, available at pins 10, 11, 12 and 13, respectively, of the connector 66, are buffered by way of buffers 96 to generate the signals -RPACK, RPBUSY, RPE and RPSLCT, respectively. The status signals RPSLCT, RPE and -RPACK are applied to pins 2A0, 2A1, and 2A2 of the status register 70 (FIG. 5A), respectively, by way of inverters 98. The signal RPBUSY is applied directly to pin 2A3 of the status register 70.

The -RPACK signal is also used to generate the parallel port interrupts BIRQ5 and BIRQ7 depending on whether the particular parallel port is configured as LPT1 or LPT2 as will be discussed below. In particular, RPACK signal, available at the output of the inverter 98, is inverted by another inverter 100 and applied to tristate devices 102 and 104 to generate-either the BIRQ5 (LPT2) or BIRQ7 (LPT1) interrupt. The tristate devices 102 and 104 are under the control of AND gates 106 and 108, respectively. These AND gates 106 and 108, in turn, are under the control of the control register 68, an AND gate 110, a NOR gate 112 and an inverter 114. Parallel port select signals PPSEL0 and PPSEL1, available at the configuration register 30 (FIG. 1) indicate whether the parallel port has been configured as either LPT1 or LPT2. More particularly, the parallel port is configured as either LPT1 or LPT2 by the CPU by way of line XD4 of the system data bus which, in turn, causes either the PPSEL0 or PPSEL1 configuration bits to be set in a configuration register, such as the configuration register 30 (FIG. 1). The system data bus line XD4 is applied to the P4 input of the control register 68. The Q4 output of the control register 68 is the parallel port interrupt enable bit. This bit is used to enable or disable interrupt generation. When the Q4 bit is inactive (low) both interrupt drivers 102 and 104 are tristated. The Q4 output of the control register 68 may be read by the CPU on line XD4 of the system data bus by way of a tristate device 116 under the control of address decode logic, within the dashed box identified with the reference numeral 118.

In particular, the parallel port select signal PPSEL1 is inverted by way the inverter 114 and NORed with the parallel port select signal PPSEL0 by way of the NOR gate 112. The output of the NOR gate 112 is ANDed with the Q4 output of the control register 68 by way of the AND gate 106. The parallel port select signal PPSEL0 is ANDed with the output of the inverter 114 by way of the AND gate 110. The output of the AND gate 110 is, in turn, ANDed with the Q4 output of the control register 68 by way of the AND gate 108.

In operation, the parallel port is configured as LPT1 by the CPU when the parallel port select signal PPSEL0 is set and the parallel port select signal PPSEL1 is deasserted. Similarly, the parallel port is configured as LPT2 when the parallel port select signal PPSEL1 is set and the parallel port select signal PPSEL0 is deasserted.

The parallel port error signal, -ERROR, available at pin 15 of the connector 66, is buffered by way of a buffer 120 to generate a signal -RPERROR. The -RPERROR signal may be read by the CPU on line XD4 of the system data bus by way of a tristate device 122. The tristate device is under the control of the address decode logic 118.

The address decode logic 118 which controls CPU reads of the status and control signals in the status register 70 as well as the Q4 output pin of control register 68 and the status signal -RPERR, includes five OR gates 123, 124, 126, 128, and 130, an inverter 132, and a NAND gate 134. More particularly, the output of the status register 70 is applied to the system data bus XD(0:7) to enable the status register 70 to be read by the CPU. Both control signals (-BISTRO, -BIAFDT, -BIINIT and -BISLTI) and status signals (RPSLCT, RPE, -RPACK and RPBUSY) are applied to the status register 70 as discussed above. These status and control signals are ready back separately under the control of the status register enable pins ENA and ENB. More particularly, the enable pins ENA and ENB of the status register 70 are active low and will enable either the outputs pins 1Y0-1Y3 or the output pin 2Y0-2Y3 on the data bus XD[0:3]or XD(4:7) respectively. When these pins ENA or ENB are high, the respective output pins 1Y0-1Y3 or 2Y0-2Y3 are in a high impedance state. The enable pins ENA and ENB of the status register 70 are under the control of the address decode logic 118.

In standard PC/AT compatible computer systems, the parallel port status and control registers 70 and 68, respectively, are mapped at addresses 379H and 37AH respectively. Thus, the address lines XA1 and XA0 along with a parallel port chip select address decode signal, -CSPRT, available from the address decode logic 26 (FIG. 1), are applied to the address decode logic 118. In particular, an I/O read signal, -XIOR, is ORed with the parallel port chip select signal, -CSPRT, by way of the OR gate 123 to indicate when the CPU is reading data from the parallel port, whether control or status information. Thus, the output of the OR gate 123 is applied to the inputs of both of the OR gates 128 and 130. The OR gates 124, 126 along with the NAND gate 134 and inverter 132 decode the system address lines to determine whether the CPU is addressing control or status information. These gates 124, 126, 134 along with the inverter 132 are thus configured to determine whether the CPU is addressing 379h or 37Ah in order to enable either the NOR gate 128 or 130, which in turn, are connected to the ENA and ENB pins of the status register 70. As mentioned above, the outputs of the OR gates 128 and 130 are also used to control the tristate devices 116 and 122, respectively, by way of inverters 136 and 138 to enable the CPU to read the Q4 pin of the control register 68 and the -RPERR signal.

The control register 68 is normally used for PC/AT compatible parallel ports. The system data bus XD(0:6) is connected its D0-D6 inputs of the control register 68 to enable CPU to write to it. The control register 68 output signals Q0-Q3 are used for the standard parallel port control signals; -STROBE, -AFXDT, -INIT and -SLCTIN during normal operation. However, during the external ROM mode of operation, these signals are redefined as discussed in Table III in order to allow the CPU to communicate with an external ROM 24 connected to the parallel port connector 66. More particularly, the Q0, Q1 and Q3 outputs of the control register 68 are ORed with various external ROM mode control signals, used during an external ROM mode of operation by way of OR gates 140, 142 and 144. Similarly, the Q2 output of the control register 68 is NORed with another external ROM control signal by way of a NOR gate 146. During normal operation, the external ROM mode control signals are low. Thus, during such a condition the OR gates 140, 142 and 144 and the NOR gate 146 are under the control of the control register 68 in order to provide the standard parallel port signal functions for a peripheral, such as printer. However, as will be discussed below in more detail, should the internal flash ROM 22 be determined to be corrupt, the standard parallel port signals are disabled and the pin functions redefined as delineated in Table III.

The external ROM mode control signals include a write signal WR, a data strobe signal DSTRB, an address strobe signal ASTRB and a byte select signal PPRBS. All but one of these signals are available from the state machine illustrated in FIG. 7 and will be discussed below in detail. Briefly, the write signal WR indicates that the current data transfer is a write to the external ROM 24. The address strobe signal ASTRB is used to write the memory address to the external ROM 24. The data strobe signal DSTRB is used to transfer data to and from the external ROM 24. Lastly the byte select signal PPRBS (FIG. 6) is used to control byte transfers to and from the external ROM 24.

The outputs of the OR gates 140, 142, 144 and the NOR gate 146 are used to generate the operate enable signals STRBOE, AFDTOE, INITOE and SLTIOE, which are applied to the tristate devices 88 within the I/O buffers 86 (FIG. 4). More particularly, the outputs of the OR gates 140, 142, 144 and the NOR gate 146 are ORed with a FSHBAD signal by way of OR gates 148, 156, 152 and 154. The FSHBAD signal indicates that the internal flash ROM 22 (FIG. 1) is corrupt. During a normal mode of operation the FSHBAD signal is low. Thus, during such a condition, the OR gates 148, 150, 152 and 154 are under the control of the OR gates 140 and 142, the NOR gate 146 and the OR gate 144, respectively to enable the standard pin functions to be selected by the CPU by way of the control register 68.

When the internal flash ROM 22 is found to be corrupt by the power up ROM 20 as discussed above, the FSHBAD signal is set. Once the FSHBAD signal is set, the AND gates 156, 158, 160 and 162 are under the control of the OR gates 140 and 142, the NOR gate 146 and the OR gate 144, respectively. In this condition, the control register 68 is also reset by the FSHBAD signal to enable the external ROM mode signals WR, DSTRB, PPRBS and ASTRB to control the OR gates 140, 142, 144 and the NOR gate 146 to allow the buffered output signals -BOSTRB, -BOAFDT, -BOINIT and -BOSLTI, available at the outputs of the AND gates 156, 158, 160 and 162 to be redefined as the external ROM mode control signals WR, DSTRB, PPRBS and ASTRB as delineated in Table III. During the external ROM mode, the output enable signals STRBOE, AFDTOE, INITOE and SLTIOE, used to control the tristate devices 88 in the I/O buffers 86, are enabled by the FSHBAD signal.

The active low buffered output control signals -BOSTRB, -BOAFDT, -BOINIT and -BOSLTI are available at the outputs of AND gates 156, 158, 160 and 162, respectively. The outputs of the OR gates 140, 142 and 144, and the NOR gate 146 are inverted by way of inverters 164, 166, 168 and 170 and ANDed with the FSHBAD signal. During a normal mode of operation, the FSHBAD signal is low, thus the AND gates 156, 158, 160 and 162 are normally disabled. During an external ROM of operation, the buffered output control signals -BOSTRB, -BOAFDT, -BOINIT and -BOSLTI are forced to be low by way of the inverters 164–170.

As previously mentioned, the system data bus XD(0:6) is applied to the D0–D6 input pins of the control register 68 in order to enable the CPU to write to it. The write control is enabled by an OR gate 172 whose output is applied to the clock CLK input of the control register 68. An I/O write signal -XIOW and the parallel port chip select signal -CSPRT (available from the address decode logic 26; FIG. 1) are ORed by way of an OR gate 174 and applied to one input of the OR gate 172. The other input to the OR gate 172 is from the output of the OR gate 124 which forms a portion of the address decode logic 118. The output of the OR gate 124 indicates the CPU has addressed the control register 68 at address 37Ah.

The control register 68 is reset under the control of an AND gate 176 which enables the control register 68 to be reset by a system reset signal, -RESET, or by way of the FSHBAD signal. More particularly, the FSHBAD signal is inverted by way of an inverter 178 and applied to one input of the AND gate 176. During a normal mode of operation the FSHBAD signal is low, thus the output of the inverter 178 will be high. In this condition, the control register 68 is reset by the system reset signal, -RESET. However, should the flash ROM 22 be determined to be corrupt, the FSHBAD signal is set, which, in turn, resets the control register 68 to enable the control signals to be redefined as discussed above and delineated in Table III.

During an external ROM mode of operation, the CPU can write to the external ROM 24 by way of the write latch 76 and can read data from the external ROM 24 by way of the read latch 74 (FIG. 5B). During a normal mode of operation, the CPU writes data to the parallel port by way of the write latch 72 (FIG. 6A).

The write latch 72 is an eight bit latch. The system data bus XD(0:7) is applied to the inputs D0–D7 of the write latch 72 while the parallel port data bus PPD(0:7), connected to pins 2–9 of the parallel port connector 66, is applied to the outputs Q0–Q7. The outputs Q0–Q7 are latched by a parallel port output signal -PPDOUT, applied to the output enable input OC of the write latch 72. The parallel port output signal -PPDOUT is available at the output of the inverter 178. The parallel port output signal is active low -PPDOUT and enables the outputs Q0–Q7 of the write latch 72 whenever the FSHBAD signal is deasserted. Thus, during a normal mode of operation, the FSHBAD signal is low which enables the outputs Q0–Q7 of the write latch 72.

Data is written to the write latch 72 under the control of write clock signal WBCLK, which is applied to the clock input CLK of the write latch 72. The write clock signal WBCLK is available at the output of an OR gate 180. One input to the OR gate 180 is the output of the OR gate 174 which indicates that the CPU has asserted an I/O write signal -XIOW and that the parallel port is being chip select address decode signal -CSPPRT is active. The other input to the OR gate 180 is from the OR gate 126 which forms a portion of the address decode logic 118. The OR gate 126 indicates when a data register is being addressed by the CPU. More particularly, in a PC/AT compatible parallel port, the data register is mapped at address 378h for LPT1 and 278h for LPT2. Thus, the system address lines XA0 and XA1 are applied to the input of the OR gate 126. During an address of the data register, these address lines XA0 and XA1 will both be low. Thus, a low output at the OR gate 126 indicates that a data register (e.g., the write latch 72 or the read latch 74) is being addressed.

The read latch 74 is an eight bit latch used to enable the CPU to read data from the external ROM 24. Thus, the system address bus XD(0:7) is applied to the Q0–Q7 outputs while the parallel port data bus PPD(0:7) is applied to the D0–D7 inputs of the read latch 74. The outputs Q0–Q7 of the read latch 74 are under the control of a read back output enable signal -RBOE, applied to the operate enable OC input. The read back operate enable signal -RBOE, which is active low, is available at the output of a NOR gate 182. The NOR gate 182 is a three input NOR gate. The output of the NOR gate 123 is applied to one input of the NOR gate 182 by way of an inverter 184. The NOR gate 123 indicates that the CPU has asserted an I/O read signal -XIOR and that the parallel port has been addressed. The output of the NOR gate 123, which is active low, is inverted by the inverter 184 and thus high when the NOR gate 123 is active low.

The output of a NOR gate 186 is applied to another input of the OR gate 182. The NOR gate 186 is a two input NOR gate. One input to the NOR gate 186 is from the OR gate 126 which indicates that a data register is being addressed as discussed above. The other input to the NOR gate 186 is the output of the OR gate 123 which indicates that the parallel port is being addressed and the CPU has asserted an I/O read signal -XIOR. Thus, when the CPU addresses a data register and asserts -XIOR both inputs to the NOR gate 186 will be low which will, in turn, cause the output to be high.

The output of a NOR gate 188 is applied to the third input of the NOR gate 182. The NOR gate 188 is a two input NOR gate. An active low, memory read signal -XMEMRI is applied to one input of the NOR gate 188. A signal PPRCMD is applied to the other input of the NOR gate 188 by way of an inverter 190. The PPRCMD signal, available from the state machine (FIG. 7), indicates that an external ROM cycle is in progress. Thus, the output of the NOR gate 188 will be high during an external ROM cycle whenever the CPU exerts a memory read signal -XMEMRI.

During an external ROM mode of operation, at least one of the inputs to the NOR gate 182 will be high when the CPU attempts to read the parallel port data bus PPD(0:7) by asserting either an I/O read signal -XIOR or a memory read signal -XMEMRI. More particularly, the read buffer 74 is used for reads of the parallel port during a normal mode of operation and for reads of the external ROM 24 during an external ROM mode of operation. The signal -IOR is used for reads during a normal mode of operation while the signal -XMEMRI is used during an external mode of operation. Since at least one of the inputs to the NOR gate 182 will be high, this will force the output of the NOR gate 182 to be low to enable the output pins Q0–Q7 of the read latch 74. As will be discussed in more detail below, this allows the CPU to execute code in the external ROM 24 when the flash ROM 22 has been found to be corrupt.

Reads of the read latch 74 are under the control of a read back clock signal RBCLK. The RBCLK signal is available at the output of an OR gate 192. The OR gate 192 is a three input OR gate. One input is from the output of the inverter 184 which is high when the parallel port has been addressed and the CPU asserts an I/O read signal -XIOR. The other input to the OR gate 192 is from the NOR gate 186 which will be high when a data register is being addressed by the CPU. The third input to the OR gate 192 is from an AND gate 194. The AND gate 194 is a three input AND gate. A WR signal, available from the state machine (FIG. 7) is applied to one input of the AND gate 194 by way of an inverter 196. The WR signal represents that the external ROM 24 is being written to and is thus used to disable the AND gate 194 during such a condition. Another input to the AND gate 194 is the signal PPRCMD, which indicates that an external ROM cycle is in progress. Lastly, a data strobe signal DASTRB is applied to the AND gate 194. The DASTRB strobes data reads of the external ROM 24 and is available from the state machine (FIG. 7) along with the PPRCMD signal as will be discussed below.

As discussed above, the write buffer 76 is used during an external ROM cycle as discussed below. The write buffer 76 is an eight bit buffer. The system data bus XD(0:7) is connected to the D0–D7 inputs. The parallel port data bus PPD(0:7) is connected to the Q0–Q7 outputs. The outputs Q0–Q7 are enabled under the control of a NOR gate 204 by way of an inverter 200. More particularly, the write buffer 76 is enabled by way of the NOR gate 204 which allows the write buffer 76 to be addressed during an external ROM mode of operation. More particularly, an active low memory write signal -XMEMWI is applied to one input of the NOR gate 204 along with a signal AD, available at the state machine (FIG. 7), which represents that the current address is an external ROM 24 address. During an external ROM mode of operation, the AD signal will be low. The signal PPRCMD from the state machine is also applied to the NOR gate 204 by way of an inverter 210. The signal PPRCMD represents that an external ROM cycle is in progress and will be active high. Thus, during an external ROM 24 memory access, the three inputs to the NOR gate 204 will be low which will cause the output to be high, which, in turn, will enable the OR gate 198 to allow the CPU to write to the write buffer 76 during such a condition.

As mentioned previously, four address multiplexers 78, 80, 82 and 84 are provided to allow the CPU to address an external ROM 24 connected to the parallel port connector 66. As will be described in more detail below, the "B" inputs of the address multiplexers 78, 80, 82 and 84 are hardwired with a two byte address for checking the identification code of the external ROM 24 connected to the parallel port connector 66. If a valid external ROM is connected to the parallel port connector, a predetermined two byte identification code will be read at the above mentioned address.

The multiplexers 78 and 80 are used for the high byte of the address while the multiplexers 82 and 84 are used for the low byte of the address. As shown, the "B" inputs of the address multiplexers 78 and 80 are hardwired with the address 40H while the address multiplexers 82 and 84 are hardwired with the address ODH which form the address for the external ROM 24 identification code. This address translates to a real address 8018H since the high byte is connected to the address lines a(16:9) and the low byte is connected to the address lines a(8:1) of the external ROM 24. The hardwired addresses are formed by connecting the respective B inputs of the address multiplexers 78, 80, 82 and 84 to either ground or high as shown in FIG. 6. The multiplexers 78, 80, 82 and 84 are configured such that the B inputs are normally selected. In particular, a PPREN signal is applied to the select Line B/A by way of an inverter 212. The PPREN signal is asserted during a CPU reset after a valid identification code is returned from the external ROM 24. Thus, prior to the determination of a valid identification code, the PPREN signal is low which, is inverted by the inverter 212 to select the "B" inputs of the multiplexers 78, 80, 82 and 84. Once a valid identification code is decoded by the logic as will be discussed below, the PPREN signal goes high, which, in turn, causes the "A" inputs of the multiplexers 78, 80, 82 and 84 to be selected. The "A" inputs of the multiplexers 78, 80, 82 and 84 are connected to the system address lines XA(16:1). In particular, the system address lines XA(16:13) are connected to the "A" inputs of the multiplexer 78 while the system address lines XA(12:9) are connected to the "A" inputs of the multiplexer 80 to form the high byte of the internal ROM address. The system address lines XA(8:5) are connected to the "A" inputs of the multiplexer 82 while the system address lines XA(4:1) are applied to the A inputs of the multiplexer 84 to form the low byte of the address for the external ROM 24.

The Y0–Y3 outputs of the address multiplexers 78, 80, 82 and 84 are applied to the parallel port data bus PPD(0:7) by way of a plurality of tristate devices 214–244. In particular, the tristate devices 214–228 are connected to the outputs of the multiplexers 78 and 80 while the tristate devices 230–244 are connected to the outputs of the multiplexers 82 and 84.

As will be discussed in more detail below, the high byte and the low byte of the address are applied to the parallel port data bus PPD(0:7) sequentially under the control of the state machine. Thus, the tristate devices 214–228 for the high byte of the address are controlled separately from the tristate devices 230–244 for the low byte of the address. Accordingly, the tristate devices 214–228 are under the control of a NAND gate 246 while the tristate devices 230–244 are under the control of a NAND gate 248. The NAND gate 246 enables the tristate devices 214–228 to allow the most significant byte of the address to be transferred to the external ROM 24 first. As will be discussed in more detail below, once the most significant byte of the address is transferred, the NAND gate 246 disables the tristate devices 214–228 and the NAND gate 248 enables the tristate devices 230–244 to enable the low byte of the address to be applied to the external ROM 24.

The NAND gate 246 is a three input NAND gate. The signals, BYTESEL, FSHBAD and AD are applied to the NAND gate 246. The BYTESEL and AD signals are available from the output of the state machine. The BYTESEL signal indicates that the current transfer is the most significant byte. The AD signal represents that the current transfer is an external ROM 24 address. Thus, the BYTESEL and AD signals will both be high when the most significant byte is being transferred to the external ROM 24. The FSHBAD signal, discussed above, is available at the configuration register 30 (FIG. 1) and indicates that the internal flash ROM 22 has been found to be corrupt. Thus, this signal will be high when the external ROM 24 is beings-addressed.

Thus, as will be discussed in more detail below, the output of the NAND 246 will be active low after the flash ROM 22 has been determined to be corrupt to enable the high byte of the address to be applied to the external ROM 24. The output of the NAND gate 246 is thus inverted by an inverter 250 and applied to the tristate devices 214–228 to enable the high byte of the address to be applied to the parallel port data bus PPD(0:7).

Once the high byte of the address is transferred, the BYTESEL signal goes low which disables the NAND gate 246, which, in turn, disables the tristate devices 214–228. Thus, a -BYTESEL is used to enable the NAND gate 248 to allow the low byte of the address to be transferred to the external ROM 24. In particular, the -BYTESEL signal along with FSHBAD and AD signals are applied to the NAND gate 248. As discussed above, the FSHBAD and AD signals will be high during such a condition. The -BYTESEL signal will be high after the high byte has been transferred. Thus, after the high byte of the address is transferred, all three inputs to the NAND gate 248 will be high which, in turn, will cause the output of the NAND gate 248 to be low. The low output of the NAND gate 248 is thus inverted by way of an inverter 252 to enable the tristate devices 230–244 to enable the low byte of the address to be transferred.

Once the two byte identification code address is transferred to the parallel port data bus PPD(0:7), the system waits for a predetermined two byte identification code which indicates that the device connected to the parallel port connector 66 is a valid external ROM 24. Should a peripheral device, such as a printer, be connected to the parallel port connector 66, the system will continue to loop until a valid external ROM 24 returns the predetermined two byte identification code as will be discussed in more detail below. If a valid external ROM is connected to the parallel port connector 66, it will contain a two byte identification code at the address 801AH. The identification code is decoded by four NOR gates 254, 256, 258 and 260 and two NAND gates 262 and 264. If a valid identification code is decoded by the gates 254–264, a flip-flop 264 is set. The output of the flip-flop 265 is a signal IDOK, which, as will be discussed below is used-as an input to the stage machine.

The high byte of the identification code is read first and stored in a latch 266 and applied to the logic gates 254 and 262. More particularly, the parallel port data bus PPD(0:7) is applied to the D0–D7 inputs of the latch 266. The operate enable input OC of the latch 266 is tied to ground such that the latch 266 is permanently enabled. The Q0–Q7 outputs of the latch 266 are thus enabled such that the high byte of the identification code PPD(15:8) is instantly applied to the logic gates 254 and 262. The latch 266 is under the control of a NAND gate 268. Three control signals are applied to the NAND gate 268; -PPREN, DSTRB and BYTESEL. The PPREN signal is asserted during a CPU reset after a valid identification code is found. Thus, the signal -PPREN will be high prior to the determination of a valid identification code. The BYTESEL is active high to transfer a high byte to or from the external ROM 24. The DSTRB signal is a data strobe signal used to transfer data to and from the external ROM 24. Thus, after the high and low identification code address bytes have been applied to the external ROM 24, the NAND gate 268 will be active low to allow the high byte of the identification code to be applied to the latch 266. As mentioned above, since the operate enable pin OC of the latch 266 is permanently enabled, this will allow the high byte of the identification code to be instantly applied to the logic gates 254 and 262.

Once the high byte of the identification code is latched by the latch 266, the NAND gate 268 is disabled by the BYTESEL signal which goes low. In the meantime, the low byte of the identification code is applied directly to the logic gates 256, 258 and 262. The outputs of the NOR gates 254, 256 and 258 are NANDed by way of the NAND gate 264 and applied to one input of the NOR gate 260 along with the output of the NAND gate 262. As shown, the output of the NOR gate 260 will be high for an identification code of OCB34H.

If the identification code OCB34H is returned from the external ROM 24, the output of the NOR gate 260 applied to the D input of the flip-flop 265 will be high. This active high decode signal will be clocked into the flip-flop 265 under the control of a NAND gate 270. The signals -PPREN, DSTRB and -BYTESEL are applied to the NAND gate 270. As discussed above, the -PPREN signal is high prior to valid identification code being found. The -BYTESEL signal is likewise high after the most significant byte of the identification code has been read. Thus, the data strobe signal DSTRB will strobe flip-flop 265 after the first byte of the identification code has been transferred to generate an IDOK signal at its Q output, which indicates that a valid identification code was returned by the external ROM 24.

The flip-flop 265 is reset by the FSHBAD signal in order to reset the state machine. More particularly, when the computer is initially powered up, the FSHBAD signal is initially low. This signal is thus used to reset the flip-flop 265. Once the flash ROM 22 has been determined to be corrupt, the FSHBAD signal goes high, which, in turn, removes the reset from the flip-flop 265.

As indicated above, the signals WR, DSTRB, ASTRB and PPRBS are used to redefine the functions of pins 1, 14, 16 and 17 of the parallel port. The signals WR, ASTRB and DSTRB are available as outputs of the state machine. The signal -PPRBS which represents a byte select is available at the output of a NAND gate 271 (FIG. 6A). The output of the NAND gate 271 will be high when any of the inputs is low. One input to the NAND gate 271 is the output of the NAND gate 246. As previously discussed, the NAND gate 246 is active low when the BYTESEL signal is set indicating a transfer of the most significant byte; the FSHBAD signal is set indicating that the flash ROM 22 has been found corrupt; and the AD signal is set, which indicates that an external ROM address is being transferred. Thus, during a transfer of the high byte of the address, the NAND gate 246 will be high which, in turn, will enable the NAND gate 271.

Another input to the NAND gate 271 is from the NAND gate 273. Three signals, -PPREN, FSHBAD and BYTESEL are applied to the input of the NAND gate 273. The output of the NAND gate 273 will thus be low when the FSHBAD and BYTESEL signals are high indicating that the transfer to or from the external ROM 24 is the high byte and the -PPREN signal is high which is high prior to a valid identification code being found. Thus, the NAND gate 273 will low during the transfer of the address bytes to the external ROM 24 and the transfer of the two byte identification code back to enable the NAND gate 271.

The third input to the NAND gate 271 is the OR gate 275. The input to the NAND gate 271 from the OR gate 275 is used after a valid identification code is found. More particularly, the output of the OR gate 275 will go low forcing the PPRBS signal high at the output of the NAND gate 271 when all of the inputs to the OR gate 275 are low. After a valid identification code is found, the signal -PPREN will be low. The signal AD will be low during data transfers. Therefore, after a valid identification code is found, the PPRBS signal will follow the XAO signal during data transfers.

STATE MACHINE

The state machine for the parallel port interface 48 is illustrated schematically in FIG. 7. The state machine is a sequential state machine with the states as identified in the state machine cycle diagram illustrated in FIG. 8. Appendix 1 illustrates a typical PAL implementation of the state machine. The equations illustrated in Appendix 1 are written in a syntax compatible with a typical PAL compiler, such as CUPL. Thus, FIG. 7 is explained in terms of its operation. Accordingly, the schematic diagram illustrated in FIG. 7 is merely described in terms of its inputs and outputs and the cycle diagram in FIG. 8 to the extent necessary to comprehend the invention. FIG. 8A illustrates the state bit definitions. The input signals to the state machine are identified in Table IV below.

TABLE IV

STATE MACHINE INPUTS

| Signal | Description |
|---|---|
| −CSPROM | External ROM chip select, address decode available from address decode logic 26 (FIG. 1) |
| −XMEMRI | CPU buffered memory read signal - standard PC/AT signal |
| −XMEMWI | CPU buffered memory write signal - standard PC/AT signal |
| IDOK | Valid identification code returned from external ROM 24 available from flip-flop 265 (FIG. 6) |
| CLK | Bus clock |
| FSHBAD (−FSHBAD) | FSHBAD is set when flash ROM 24 found to be corrupt - available from configuration register 30 (FIG. 1) |
| RESET | Active high system reset |
| −ACK | Peripheral acknowledge signal - available from inverter 100 (FIG. 5) |

The state machine output signals are illustrated in Table V.

TABLE V

STATE MACHINE OUTPUT SIGNALS

| Signal | Description |
|---|---|
| PPRCMD | Indicates that an external ROM cycle is in progress |
| PPREN (−PPREN) | This signal is asserted during a CPU reset after a valid identification code is found to cause the address decode logic 26 to remap the external ROM 24 as shown in Table 1. |
| WR | This signal indicates that the current transfer is a write to the external ROM 24 |
| BIOCDO | When asserted, this signal is used to extend the CPU cycle by adding wait states |
| AD | When asserted, this signal indicates that the current transfer is an external ROM 24 address |
| BYTESEL (−BYTESEL) | This signal indicates that the current transfer is the most significant byte |
| −PPFRC | This signal is used to force a reset of |

TABLE V-continued

STATE MACHINE OUTPUT SIGNALS

| Signal | Description |
|---|---|
| | the CPU after a valid identification code is found |
| ASTRB | This signal is an external ROM address strobe used to write the memory address to the external ROM 24 |
| DSTRB | This signal is an external ROM data strobe used to transfer data to and from the external ROM 24 |

The state machine, represented within the dashed box 272, is represented by a plurality of flip-flops 274-288, a plurality of AND gates 290-316, a plurality of OR gates 318-328, a plurality of NOR gates 330-340 and a plurality of inverters 342-346 connected as shown in FIG. 7. The flip-flops 274-288 are clocked by a signal formed from NORing the bus clock signal CLK with a -FSHBAD signal by way of the NOR gate 340. The output of the NOR gate 340 is inverted by the inverter and applied to the clock inputs CLK of the flip-flops 274-288.

As mentioned above, the FSHBAD bit is set by the configuration register 30 (FIG. 1) whenever the internal flash ROM 22 is found to be corrupt by the firmware. Table VI shows the states of the state machine outputs before the FSHBAD signal is asserted.

TABLE VI

| SIGNAL | STATUS |
|---|---|
| AD | High |
| ASTRB | Low |
| BIOCDO | Low |
| BYTESEL | High |
| DSTRB | Low |
| −PPFRC | High |
| PPRCMD | Low |
| PPREN | Low |
| WR | Low |

Figure 9:
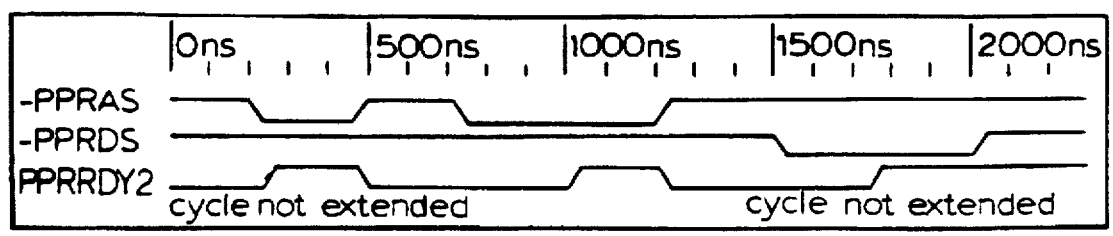
FIG. 9 is a timing diagram illustrating the use of a channel ready signal for extending the cycle time.

Initially, the state machine 272 loops in an idle state in step 348 until the FSHBAD signal is set by the configuration register 30 (FIG. 1). Since the PPRRDY flip-flop 278 is reset when the FSHBAD signal is low, once the FSHBAD bit is set, the state machine proceeds from state 348 to state 350 regardless of the state of the PPRRDY signal. The signal PPRRDY is an internal state variable signal, available at the output of the flip-flop 278, used to extend any cycle. With reference to FIG. 9, when the PPRRDY signal is low, the cycle is extended until the PPRRDY signal goes high. When a current transfer is in progress, the state machine 272 will wait in state 350 until the acknowledge line ACK is deasserted which indicates that the parallel port is ready to accept the address byte. On the next clock pulses 352 and 354, the channel ready signal PPRRDY signal is set and the parallel port strobe signal PRSTRB, available at the output of the flip-flop 288, is reset. The signal PRSTRB is used to set the address strobe signal ASTRB, which, in turn, generates the parallel port address strobe signal -PPRAS that is applied to pin 17 of the parallel port connector 66 during an external ROM mode of operation. Once the address strobe signal -PPRAS is asserted, the high byte of the identification code address is written by the address multiplexers 78 and 80. If an external ROM 24 is connected to the parallel port connector 66, the high byte of the identification code address will be acknowledged by asserting an acknowledge signal -ACK.

The high byte of the identification code address is acknowledged in state 350 causing the state machine 272 to move to state 352, where the PPRRDY signal is asserted. On the next clock pulse, the state machine 274 proceeds to state 354 where the signal PRSTRB signal is reset causing the signal -PPRAS to go high (inactive). On the next clock pulse, the state machine 272 moves to state 356. In state 356, the PPRRDY signal and the BYTESEL signal are reset. After the BYTESEL and PPRRDY signals are deasserted, the state machine 272 progresses to state 358 on the next clock pulse in order to write the low byte of the identification code address. In this state 358 the PRSTRB signal is asserted causing the signal -PPRAS to go active. The state machine 272 will stay in state 358 until the -ACK signal is asserted. The low byte of the identification code address is written in states 358 and 360 when the -PPRAS signal is active. When the -ACK signal is asserted in state 358, the state machine 272 goes to state 360 asserting PPRRDY. At the next clock pulse, the state machine 272 moves from state 360 to state 362. In state 362, the PRSTRB output of the flip-flop 288 is reset causing the -PPRAS signal to go inactive (high). On the next clock pulse the state machine 272 moves from state 362 to state 364. In state 364, the PPRRDY output of the flip-flop 278 is reset; the BYTESEL output of the flip-flop 284 is set; and the AD output of the flip-flop 282 is reset. On the next clock pulse, the state machine 272 moves from state 364 to state 366 where the PRSTRB output of the flip-flop 288 is set. This causes the -PPRDS signal to go active, indicating the transfer of the high byte of the identification code from the external ROM 24. The state machine 272 will remain in this state until ROM control logic asserts the -ACK signal. The PRSTRB output of the flip-flop 288 is set in state 366. When the signal -ACK is asserted in state 366, the state machine goes to state 368 where the PPRRDY output of the flip-flop 278 is set. On the next clock pulse, the state machine 272 moves to state 370 where the PRSTRB output of the flip-flop 288 is reset. The data strobe signal DSTRB, in turn, is used to generate the parallel port data strobe signal -PPRDS, applied to pin 14 of the parallel port connector 66.

The parallel port data strobe signal -PPRDS allows the high byte of the identification code to be read. On the next clock pulse, the state machine 272 moves from state 370 to state 372 in which the PPRRDY output of the flip-flop 278 is reset as well as the BYTESEL output of the flip-flop 284. On the next clock pulse, the state machine 272 moves to state 374 where the PRSTRB output of the flip-flop 288 is set. This causes the -PPRDS signal to go active, allowing the transfer of the low byte of the identification code from the external ROM 24. The state machine 272 will remain in state 374 until the -ACK signal is asserted by the external ROM 24. Once the -ACK signal is asserted, the state machine 272 moves to state 376 on the next clock pulse. In this state 376 the PPRRDY output of the flip-flop 278 is asserted. On the next clock pulse the state machine 272 proceeds to state 378 in which the PRSTRB output of the flip-flop 288 is reset. If a valid identification code is present, the IDOK output of the flip-flop 265 will go active at the falling edge of the PRSTRB signal. If a valid identification code is found, the IDOK signal is set by the flip-flop 265 (FIG. 6) which indicates that a valid external ROM 24 is connected to the parallel port connector 66. If a valid identification code is not found, the state machine 272 loops back to state 348 and repeats steps 348-378 until a valid identification code is found.

Once a valid identification code is found (e.g., an IDOK signal set), the state machine 272 proceeds to step 380 on the next clock pulse. In state 380, the PPRRDY output of the flip-flop 278 is reset; the BYTESEL output of the flip-flop 284 is set; and the AD output of the flip-flop 282 is set. Also in state 380, the IOCHRDY signal is deasserted to extend the current CPU cycle. The IOCHRDY signal remains deasserted in states 380-384. On the next clock pulse, the -PPFRC signal is set in step 382. The CPU is fast reset by way of a signal -PPFRC, available at the output of the flip-flop 286, on the next clock pulse in step 384. In this state 384, the PPREN output of the flip-flop 275 is asserted. In particular, once the signal -PPFRC is set, the signal PPREN is set. The signal PPREN is active during a CPU reset. Also, while the reset is active, the address decode logic 26 (FIG. 1) reconfigures the memory address of the external ROM 24 to reside at the boot address as discussed above.

On the next clock pulse, the state machine 272 moves from state 384 to state 386 in-which the -PPFRC and BIOCDO signals are deasserted. When a CPU read or write command to the external ROM 24 occurs, identified by -SMEMRI or -XMEMWI, and -CSPROM active, the PPRCMD output of the synchronizing flip-flop 274 is asserted.

Although not shown in the state machine diagram, the IOCHRDY signal is deasserted at this time to extend the cycle by adding wait states to the CPU. This allows the PPROM control logic the time necessary to transfer the address to the external ROM before transferring the data.

The state machine 272 remains in state 386 until the PPRCMD signal is asserted. When the PPRCMD signal is asserted, the state machine 272 moves to state 388 on the next clock pulse. In state 388, the PRSTRB output is asserted causing the -PPRAS signal to go active transferring the high byte of the external ROM address. The state machine 272 will remain in state 388 until the -ACK signal is asserted, acknowledging the transfer. When -ACK is asserted by the external ROM control logic, the state machine 272 moves from state 388 to state 390 in which the PPRRDY output is asserted. On the next clock pulse, the state machine 272 goes to state 392 where the PRSTRB output is deasserted, finishing the transfer. On the next clock pulse, the state machine 272 goes to state 394 where the PPRRDY and the BYTESEL signals are deasserted. The PRSTRB output is asserted causing the -PPRAS signal to go active, transferring the low byte of the external ROM address on the next clock pulse in state 396. The state machine 272 will remain in state 396 until the -ACK signal is asserted, acknowledging the transfer. When -ACK is asserted by the external ROM control logic, the state machine 272 moves from state 396 to state 398 in which the PPRRDY signal is asserted. On the next clock pulse, the state machine 272 goes to state 400 where the PRSTRB output is deasserted, finishing the transfer. After the transfer is finished, the state machine 272 goes to state 402 on the next clock pulse where the PPRRDY signal is deasserted; the BYTESEL signal is asserted; and the AD signal is deasserted. On the next clock pulse, state 404 is entered. In state 404, the PRSTRB output is asserted causing the -PPRDS signal to go active, transferring the data to (or from) the external ROM 24. The direction of the data transfer is determined by the WR signal. The WR signal will be asserted during the writing of the address during address strobes and asserted during data strobes if the XMEMWI signal is active. Otherwise, the WR signal will be deasserted during data strobes. The state machine 272 will remain in state 404 until the data transfer is acknowledged by the external ROM control logic asserting -ACK. When the -ACK signal is asserted, the state machine 272 will move from state 404 to state 406 in which the PPRRDY signal is asserted. On the next clock pulse, the state machine 272 goes to state 408 where the PRSTRB output is deasserted. Also at this time, the IOCHRDY signal is asserted allowing the CPU to complete the transfer. The state machine 272 will remain in this state until the PPRCMD output of flip-flop 274 is deasserted. When the PPRCMD signal is deasserted by the CPU deasserting either the -XMEMRI or -XMEMWI signals the state machine 272 will go to state 410. In state 410, the BYTESEL signal is deasserted. On the next clock pulse, the state machine 272 returns to state 386 to wait for the next external ROM cycle. In state 386, the PPRRDY signal is deasserted; the BYTESEL signal is asserted; and the AD signal is asserted. The state machine 272 then loops back to state 386 and repeats steps 386-410 to execute additional code from the external ROM 24.

EXTERNAL ROM

Figure 10:
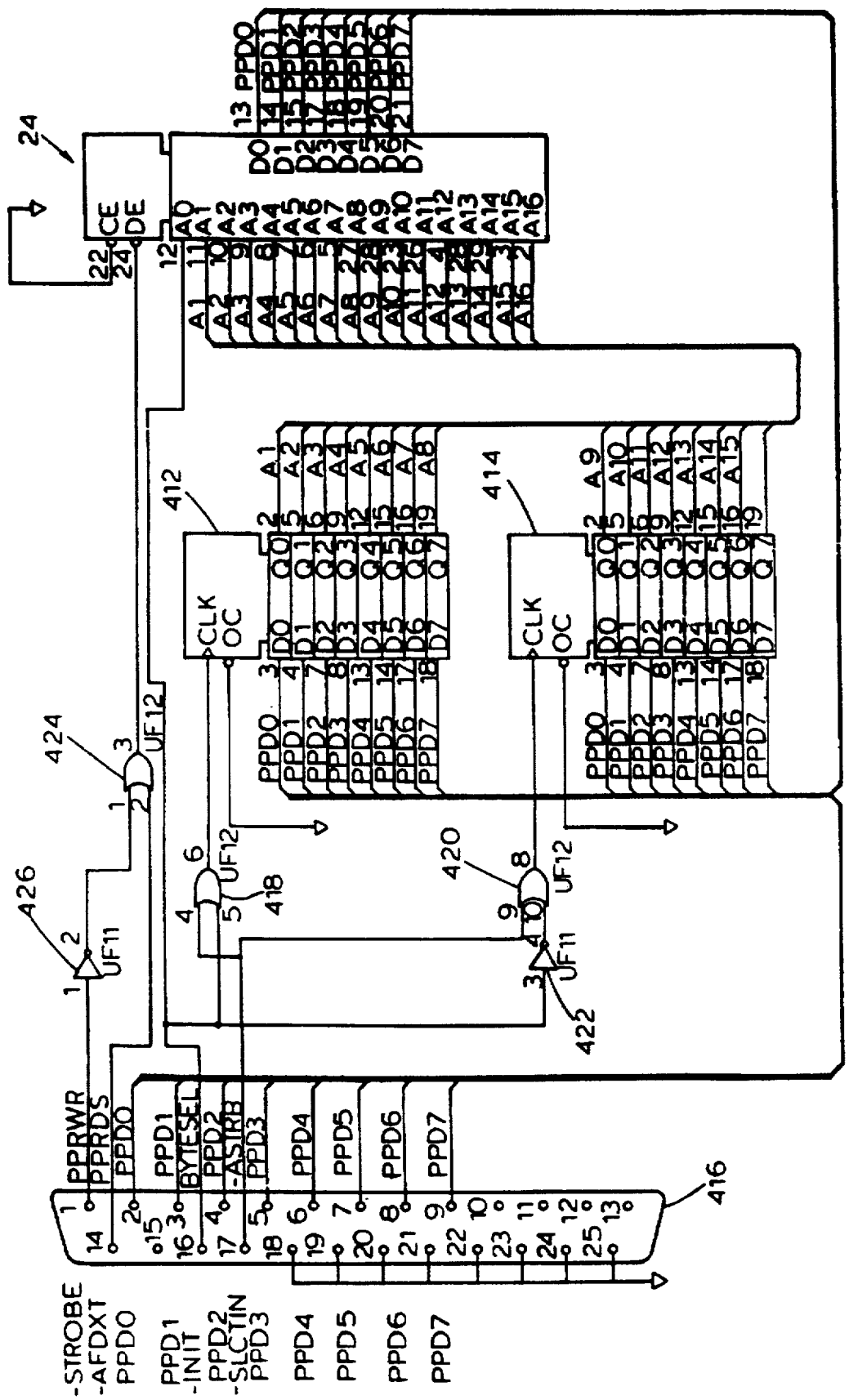
FIG. 10 is a schematic diagram of an external ROM, which may be programmed with the BIOS routines, that is adapted to be connected to a parallel port.

The external ROM 24, illustrated in FIG. 10, includes a pair of address latches 412 and 414 and a 25 pin D type connector 416. The parallel port data bus PPD(0:7), pins 2-9 of the connector 416, are connected to the inputs of the address latches 412 and 414. The outputs form the external ROM 24 address lines A0-A16 are connected to the address inputs of the external ROM 24. The output of the external ROM 24 is also connected to the parallel port data bus PPP(0:7) in order to enable data to be read back from the external ROM 24.

A pair of OR gates 418 and 420 are used to control latching of the high and low bytes of the address. More particularly, the address strobe -ASTRB and byte select BYTESEL signals, available at pins 17 and 16, respectively, of the connector 416, are applied to the OR gates 418 and 420 to control latching of the address bytes. An inverter 422 is used to invert the BYTESEL signal to the OR gate 420 to control latching of the high address byte to the latch 414.

The external ROM 24 is under the control of an OR gate 424. The write strobe signal -PPRWR is applied to one input of the NOR gate 424 by way of an inverter 426. The data strobe signal -PPRDS is connected to the other input. The NOR gate 424 enables data to be read from the external ROM 24.

While the invention has been described with reference to details of the embodiments shown in the drawings, these details are not intended to limit the scope of the invention as described in the appended claims.

APPENDIX 1

The following shows a typical PAL implementation of the state machine illustrated in FIG. 7. The equations are written in a syntax that a typical PAL compiler, CUPL, would understand. An output name followed by a 'j', 'k', 'd' or 'clr' indicates that the equation is for the J, K, D or Clear inputs of the flip-flop, respectively. Output names with no postfix are not clocked outputs.

| OUTPUT | | EQUATION |
|---|---|---|
| AD.jk | = | PPRRDY & -PRSTRB & -BYTESEL |
| ASTRB | = | AD & PRSTRB |
| BIOCDO.j | = | PPREN & PPFRC |
| | | + PPREN & PRSTRB & -AD & PPRRDY |
| BIOCDO.k | = | IDOK & -PPREN |
| BIOCDO.clr | = | PPREN & -PPCMD & CSPROM & (XMEMRI + XMEMWI) |

-continued

| OUTPUT | | EQUATION |
|---|---|---|
| BYTSEL.jk | = | -PRSTRB & PPPRDY & (AD + -PPRCMD + -BYTSEL) |
| DSTRB | = | -AD & PRSTRB |
| PPFRC.d | = | BIOCDO & -PPREN |
| PPRCMD.d | = | CSPROM & (XMEMRI + XMEMWI) |
| PPREN.d | = | FSHBAD & FASTRC + PPREN |
| PPREN.clr | = | RESET + (-FSHBAD & FASTRC) |
| WR | = | FSHBAD & (AD + PPRCMD & XMEMWI) |

PPRRDY is an internally used state bit. The equation for PPRRDY is shown below:

PPRRDY.d = -ACK & PRSTRB
+ BYTSEL & -AD & PPREN & PPRRDY

What is claimed and desired to be secured by a Letters Patent of the United States is:

1. A control system for a computer system which includes a CPU, a flash read only memory (ROM) with basic input output instructions (BIOS) stored thereon and a standard parallel port connector, comprising:

a parallel port system having two modes of operation; a standard parallel port mode wherein in response to a first predetermined group of signals, said parallel port operates as a standard parallel port; and a flash recovery mode wherein said parallel port is responsive to a second predetermined group of signals to enable said CPU to execute the BIOS from an external device adapted to be connected to said parallel port in the event said flash ROM becomes corrupt to enable the computer to be booted while the corrupted flash ROM remains in-circuit;

means for providing said first predetermined group of signals to said parallel port system during said standard parallel port mode of operation wherein said first predetermined group of signals are standard parallel port signals; and means for providing said second predetermined group of signals to said parallel port system during said flash recovery mode of operation, said second predetermined group of signals redefining a predetermined subset of said standard parallel port signals with alternate parallel port functions.

2. A computer system which includes a CPU and a parallel port mapped at a predetermined address contained within a housing, comprising;

means for providing basic input output instructions (BIOS) to enable said cpu to communicate with peripheral devices adapted to be connected to said one or more parallel ports, said providing means including a flash ROM;

means for checking the integrity of said flash ROM, said checking means including means for remapping the address of one of said parallel ports and redefining a predetermined subset of standard signals in the parallel port with alternate parallel port functions under a predetermined condition; and means for updating said BIOS without the need to open said housing, said updating means including means for enabling said BIOS to be updated from a parallel port, and generating control signals for said parallel port to enable BIOS contained in an external memory device adapted to be connected to said parallel port to be executed from said parallel port.

3. A computer system as recited in claim 2, wherein said predetermined condition exists when said flash ROM has been determined to be corrupt by said checking means.

4. A computer system as recited in claim 2, further including means for providing an aural indication of the results of said checking means.

5. A computer system as recited in claim 2, further including means for providing a visual indication of the results of said checking means.

6. A method for providing BIOS instructions to a computer system comprising the steps of:

(a) providing the BIOS instruction on an internal memory device;

(b) checking the integrity of the internal device on power-up; and (c) providing alternate means to boot the computer in the event the internal memory device is found to be corrupt, said alternate means including means for executing BIOS from an external device by way of a standard parallel port, said standard parallel port having a predetermined subset of its original signals being redefined with alternate parallel port functions when said internal memory device is found to be corrupt and wherein said external device is adapted to be connected to said parallel port.

7. A method as recited in claim 6, wherein said internal memory device is a flash ROM.

8. A method for generating signals for a parallel port for a computer system which includes a CPU and a flash read only memory (ROM) with basic input output instruction (BIOS) stored thereon comprising the steps of:

(a) providing a parallel port system having two modes of operation; a standard parallel port mode wherein in response to a first predetermined group of signals, said parallel port operates as a standard parallel port; and a flash recovery mode wherein said parallel port is responsive to a second predetermined group of signals, said second predetermined group of signals redefining a predetermined subset of said standard parallel port signals with alternate parallel port functions to enable said CPU to execute the BIOS from an external device adapted to be connected to said parallel port in the event said flash ROM becomes corrupt to enable the computer to be booted while the corrupted flash ROM remains in-circuit;

(b) generating said first predetermined group of signals during said standard parallel port mode of operation wherein said first predetermined group of signals are standard parallel port signals;

(c) generating said second predetermined group of signals during said flash recovery mode of operation wherein said second predetermined group of signals is adapted to enable the computer system to execute the BIOS from an external device adapted to be connected to said parallel port in the event that the data in the flash ROM becomes corrupt to enable the computer to be booted while said corrupted flash ROM remains in-circuit.

9. A method as recited in claim 8, wherein said controlling means includes means for checking a predetermined portion of the computer memory.

10. A method as recited in claim 9, wherein said second mode is selected when said predetermined portion of memory is found to be corrupt.

11. A control system for a computer system which includes a CPU and a standard parallel port connector, comprising:

a parallel port system having two modes of operation; a standard parallel port mode wherein in response to a first predetermined group of signals, said parallel port operates as a standard parallel port; and a flash recovery mode wherein said parallel port is responsive to a second predetermined group of signals, said second predetermined group of signals redefining a predetermined subset of said standard parallel port signals with alternate parallel port functions to enable said CPU to execute the BIOS from an external device adapted to be connected to said parallel port in the event said flash ROM becomes corrupt to enable the computer to be booted while the corrupted flash ROM remains in-circuit;

means for providing said first predetermined group of signals to said parallel port system during said standard parallel port mode of operation and handshaking with a device adapted to be connected to said parallel port, said handshaking being controlled by software; and means for providing said second predetermined group of signals to said parallel port during said flash recovery mode of operation and handshaking with an external device adapted to be connected to said parallel port, said handshaking being controlled by hardware.

* * * * *

UNITED STATES PATENT AND TRADEMARK OFFICE
CERTIFICATE OF CORRECTION

PATENT NO. : 5,634,079
DATED : May 27, 1997
INVENTOR(S) : Buxton

It is certified that error appears in the above-indentified patent and that said Letters Patent is hereby corrected as shown below:

Column 20, line 48, change "cpu" to --CPU--.

Signed and Sealed this

Sixteenth Day of September, 1997

Attest:

BRUCE LEHMAN

Attesting Officer     Commissioner of Patents and Trademarks